US012166599B2

(12) United States Patent
Dotan-Cohen et al.

(10) Patent No.: US 12,166,599 B2
(45) Date of Patent: Dec. 10, 2024

(54) PERSONALIZED NAVIGABLE MEETING SUMMARY GENERATOR

(71) Applicant: Microsoft Technology Licensing, LLC, Redmond, WA (US)

(72) Inventors: Dikla Dotan-Cohen, Redmond, WA (US); Inbal Maimon, Redmond, WA (US); Ido Mordechai Priness, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/067,499

(22) Filed: Dec. 16, 2022

(65) Prior Publication Data
US 2024/0205038 A1    Jun. 20, 2024

(51) Int. Cl.
| | | |
|---|---|---|
| *H04L 12/18* | (2006.01) | |
| *G06F 3/0484* | (2022.01) | |
| *H04L 65/403* | (2022.01) | |
| *H04L 67/02* | (2022.01) | |
| *G06F 3/048* | (2013.01) | |

(Continued)

(52) U.S. Cl.
CPC ........ *H04L 12/1831* (2013.01); *G06F 3/0484* (2013.01); *H04L 65/403* (2013.01); *H04L 67/02* (2013.01); *G06F 3/048* (2013.01); *G06F 3/04812* (2013.01); *G06F 3/0482* (2013.01); *H04L 12/1822* (2013.01)

(58) Field of Classification Search
None
See application file for complete search history.

(56) References Cited

U.S. PATENT DOCUMENTS 7,379,848 B2 * 5/2008 Yu .................. G06Q 10/10
702/186
8,739,046 B2   5/2014 Sloyer et al.
(Continued)

OTHER PUBLICATIONS

"Meeting Insights", Retrieved From : https://www.audiocodes.com/media/14830/meeting-insights-quick-guide.pdf, Oct. 18, 2022, 176 Pages.

(Continued)

*Primary Examiner* — Lashonda Jacobs-Burton
(74) *Attorney, Agent, or Firm* — Shook, Hardy & Bacon L.L.P.

(57) ABSTRACT

Technology is disclosed for programmatically providing structured and personalized meeting content that both (1) summarizes aspects of a meeting recording and (2) is used to navigate to a section of the meeting recording. To do so, the disclosure provides technologies to determine sections of the meeting recording. For each section of the meeting recording, a section representation and a meeting structure for presenting the section representation are determined. The section representation includes an image and a text summary of the corresponding section of the meeting recording. Additionally, the disclosure provides technologies to automatically generate a personalized navigable meeting recording (PNMR) user interface (UI) based on the meeting structure, the PNMR UI comprising an indication of each section based on the section representation. Selection of a section representation causes playback of the meeting recording to change to the section associated with the section representation.

20 Claims, 10 Drawing Sheets

(51) Int. Cl.
*G06F 3/04812* (2022.01)
*G06F 3/0482* (2013.01)

(56) References Cited

U.S. PATENT DOCUMENTS

| | | | | |
|---|---|---|---|---|
| 8,914,452 | B2* | 12/2014 | Boston | G06Q 10/10 709/206 |
| 9,037,973 | B1* | 5/2015 | Hintermeister | H04N 21/47 715/728 |
| 9,665,237 | B1* | 5/2017 | Hintermeister | H04N 21/47214 |
| 9,779,389 | B2 | 10/2017 | Thapliyal et al. | |
| 9,875,225 | B1 | 1/2018 | Grueneberg et al. | |
| 10,386,986 | B1* | 8/2019 | Hintermeister | H04N 21/4325 |
| 10,788,963 | B2 | 9/2020 | Quinn et al. | |
| 10,798,341 | B1* | 10/2020 | Hegde | H04N 21/8549 |
| 10,915,570 | B2* | 2/2021 | Ramamurthy | G06F 16/433 |
| 10,958,457 | B1* | 3/2021 | Davis | H04L 12/2803 |
| 11,080,356 | B1 | 8/2021 | Kumar et al. | |
| 11,128,483 | B1 | 9/2021 | Surazski et al. | |
| 11,176,949 | B2 | 11/2021 | Adlersberg et al. | |
| 11,271,978 | B2 | 3/2022 | Ranalli et al. | |
| 11,372,525 | B2* | 6/2022 | Faulkner | H04N 21/4312 |
| 11,410,426 | B2* | 8/2022 | Kikin-Gil | G06V 20/47 |
| 11,468,895 | B2* | 10/2022 | Yoshioka | G06Q 10/10 |
| 11,681,819 | B1* | 6/2023 | Surazski | G06F 16/9535 726/28 |
| 11,710,509 | B1* | 7/2023 | Bhupati | G11B 27/036 386/282 |
| 2005/0246732 | A1* | 11/2005 | Dudkiewicz | H04N 21/47 725/45 |
| 2006/0089820 | A1* | 4/2006 | Yu | G06Q 10/10 702/186 |
| 2006/0167662 | A1* | 7/2006 | Yu | G06Q 10/10 702/186 |
| 2008/0276174 | A1* | 11/2008 | Hintermeister | H04N 21/8456 715/720 |
| 2009/0119246 | A1* | 5/2009 | Kansal | G06F 16/48 |
| 2012/0166985 | A1* | 6/2012 | Friend | G06F 9/454 715/765 |
| 2012/0325972 | A1* | 12/2012 | Gryniewski | B64G 1/14 244/172.4 |
| 2013/0191452 | A1* | 7/2013 | Beerse | H04L 65/403 709/204 |
| 2013/0325972 | A1* | 12/2013 | Boston | G06Q 10/10 709/204 |
| 2016/0269449 | A1* | 9/2016 | Modai | H04L 12/1822 |
| 2016/0321263 | A1* | 11/2016 | Madiraju | G06F 16/2457 |
| 2016/0342639 | A1 | 11/2016 | Ignjatic et al. | |
| 2017/0011740 | A1* | 1/2017 | Gauci | G06F 40/169 |
| 2017/0064254 | A1 | 3/2017 | Mueller et al. | |
| 2017/0101258 | A1* | 4/2017 | Wicks | B65D 77/2024 |
| 2018/0314391 | A1* | 11/2018 | Beerana | G06F 3/147 |
| 2019/0303879 | A1* | 10/2019 | Mankovskii | G06F 3/167 |
| 2020/0193389 | A1* | 6/2020 | Lagares-Greenblatt | G06Q 10/063114 |
| 2020/0267446 | A1* | 8/2020 | Hernejärvi | H04N 21/44222 |
| 2020/0311122 | A1* | 10/2020 | Ramamurthy | G06N 20/20 |
| 2020/0374146 | A1* | 11/2020 | Chhabra | H04L 12/1822 |
| 2020/0403817 | A1* | 12/2020 | Daredia | G06F 16/438 |
| 2021/0092168 | A1* | 3/2021 | Ranalli | H04M 3/567 |
| 2021/0097502 | A1* | 4/2021 | Hilleli | G06N 20/20 |
| 2022/0276879 | A1* | 9/2022 | Rajagopal | G06F 16/9537 |
| 2022/0353101 | A1* | 11/2022 | Hu | H04L 12/1822 |
| 2022/0400026 | A1* | 12/2022 | Guggari | G06Q 10/1093 |
| 2023/0247245 | A1* | 8/2023 | Fanfani | G06Q 30/0603 725/34 |
| 2023/0275938 | A1* | 8/2023 | Kwatra | H04L 65/1093 709/204 |

OTHER PUBLICATIONS

Miura, "Discussion Summarization Based on Hierarchical Structure Using Verbal and Non-Verbal Information", In Proceedings of the World Congress on Engineering and Computer Science, vol. 1, Oct. 23, 2018, 6 Pages.

Shi, et al., "MeetingVis: Visual Narratives to Assist in Recalling Meeting Context and Content", In Proceedings of IEEE Transactions on Visualization and Computer Graphics, vol. 24, Issue 6, Jun. 1, 2018, 12 Pages.

Behera, et al., "DocMIR: An automatic document-based indexing system for meeting retrieval," Springer Link, vol. 37, Issue. 2008, 33 Pages.

Chi, et al., "MixT: Automatic Generation of Step-by-Step Mixed Media Tutorials," Digital Library, Issue. 2012, 10 Pages.

International Search Report and Written Opinion received for PCT Application No. PCT/US23/036068, Feb. 13, 2024, 18 pages.

\* cited by examiner

PERSONALIZED NAVIGABLE MEETING SUMMARY GENERATOR

BACKGROUND

Certain people spend a significant amount of their time in meetings, presentations, and lectures, such as for school or for work. Moreover, certain people are attending more meetings more often, as they are working remotely more often and thus have fewer unplanned interactions with co-workers, often communicating with others via meeting applications including time collaborating or working with teams or groups of people. Often, meetings overlap or particular projects or courses may involve multiple meetings. Consequently, certain people are spending increasing amounts of time listening to meeting recordings, reviewing their meeting notes, and catching up on missed meetings or content that they missed.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed toward technologies for improving the functionality of multimedia content generated or presented by computing applications accessible on user computing devices. In particular, this disclosure provides certain technologies to programmatically provide structured and personalized meeting content that both (a) summarizes aspects of a meeting recording and (b) can be used to navigate to portions of the meeting recording.

Embodiments described in the present disclosure include receiving and processing a meeting recording (for example, post-processed after completion of the meeting) to determine meeting sections and/or subsections based on meeting features, which are determined from the meeting recording. Embodiments described in the present disclosure include determining a meeting section representation, which comprises at least one of an image, a text summary, or similar media format representation. In one example, the section representation is determined for each section of a meeting based on a corresponding meeting feature specific to the meeting recording and/or a user feature specific to the user. Embodiments described in the present disclosure include determining a meeting structure based on the sections, the user features, and/or corresponding meeting features. In one example, the meeting structure is the logical organization by which the sections are organized. Example logical organizations include a hierarchical logical organization, a chronological logical organization, a speaker-indexed logical organization, a topic-indexed logical organization, a relevance ranked logical organization, or any other suitable logical organization relevant to the user.

In some embodiments, the operation of a computer application, such as a communication application or video hosting application, is configured or modified to execute computer instructions for generating a personalized navigable meeting recording (PNMR) user interface (UI) based on the meeting structure and the meeting section representations. For example, in one embodiment, the PNMR UI includes (1) a player region that includes a presentation of the meeting recording and (2) a section representation region including one or more meeting section representations arranged based on the meeting structure. In one example, where the structure is determined based on relevance to the user, the PNMR UI depicts the section representations based on importance to the user, thus providing a recap of the meeting that is relevant to and personalized for the user. In another example, where the structure is hierarchical, the navigable meeting recording UI includes the section representations that are lower in the hierarchy nested under another a section representation higher in the hierarchy.

Selection of a particular section representation causes the PNMR UI to toggle playback of the meeting recording to the portion of the meeting recording corresponding to the selected section representation. In this manner, certain section representations on the PNMR UI provide a rich display of information (such as an image and/or a text summary) that facilitates identifying and selecting relevant sections of the meeting recording for presentation as compared to other techniques, such as by manually toggling to a random portion of the meeting in search of particular content.

Such disclosed technologies improve the user experience in any of a number of computer applications and platforms. Further, these technologies reduce computational resources and bandwidth associated with a user downloading and playing back random portions of a large file of the meeting recording in search of a particular section of the meeting recording. For example, a user in search of a particular section of the meeting recording will randomly play back many portions of the meeting in search of a target portion of the meeting, thereby expending local or distributed computational resources associated with servicing the user's manual requests for toggling to erroneous and irrelevant portions of the meeting recording. To avoid bandwidth strains, embodiments disclosed herein support on-demand download of the sections of the meeting. For example, the meeting recording may be cached, and the section of the meeting recording corresponding to a meeting section representation may be downloaded during times of lower user activity and less computational resource consumption.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. The method(s) described herein may comprise a computing process that may be performed using any combination of hardware, firmware, and/or software. For example, various functions are carried out by a processor executing instructions stored in memory. In another example, the methods are embodied as computer-useable instructions stored on computer storage media. In another example, the methods are provided by a stand-alone application, a service or hosted service (stand-alone or in combination with another hosted service), or a plug-in to another product, to name a few.

Aspects of the present disclosure relate to technology for improving electronic communication technology and enhanced computing services for a user, to improve the generation of meeting-recorded content and tools for improving navigation to a target portion of a meeting recording. In particular, the solutions provided herein include certain technologies to programmatically determine sections of a meeting recording, and programmatically determine for the sections (1) a section representation that is specific to a user, and (2) a meeting structure that is specific to the user and the meeting. Additional solutions provided herein include certain technologies to programmatically generate, based on the meeting structure and/or the section representation, a personalized navigable meeting-recording (PNMR) user interface (UI). Certain embodiments discussed herein use the terms UI and graphical user interface ("GUI") interchangeably.

Figure 3:
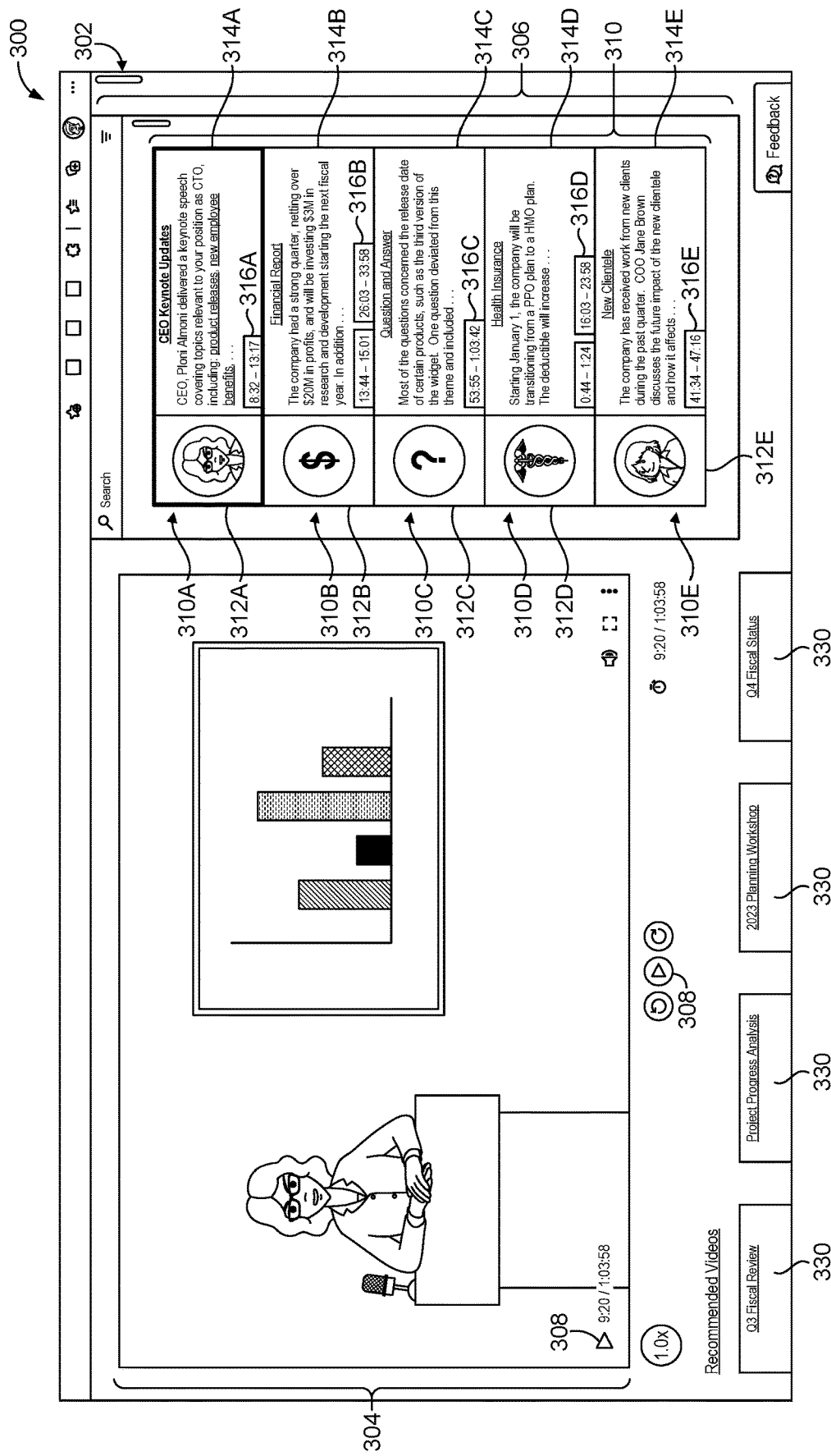
FIG. 3 illustratively depicts an example schematic screenshot from a personal computing device showing aspects of an example graphical user interface (GUI), in accordance with an embodiment of the present disclosure.
Figure 4:
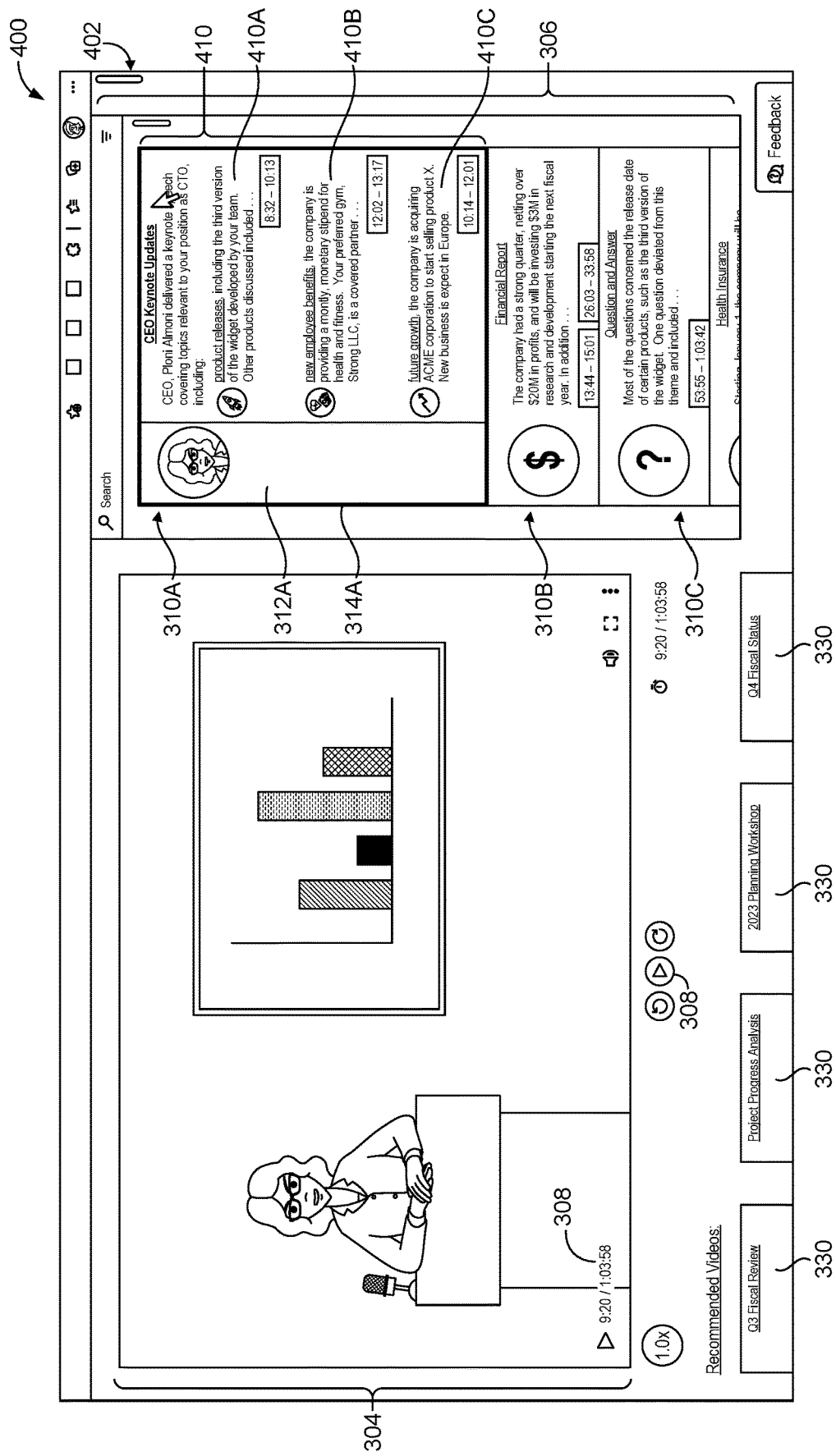
FIG. 4 illustratively depicts an example schematic screenshot from a personal computing device showing aspects of an example GUI, in accordance with an embodiment of the present disclosure.
Figure 5:
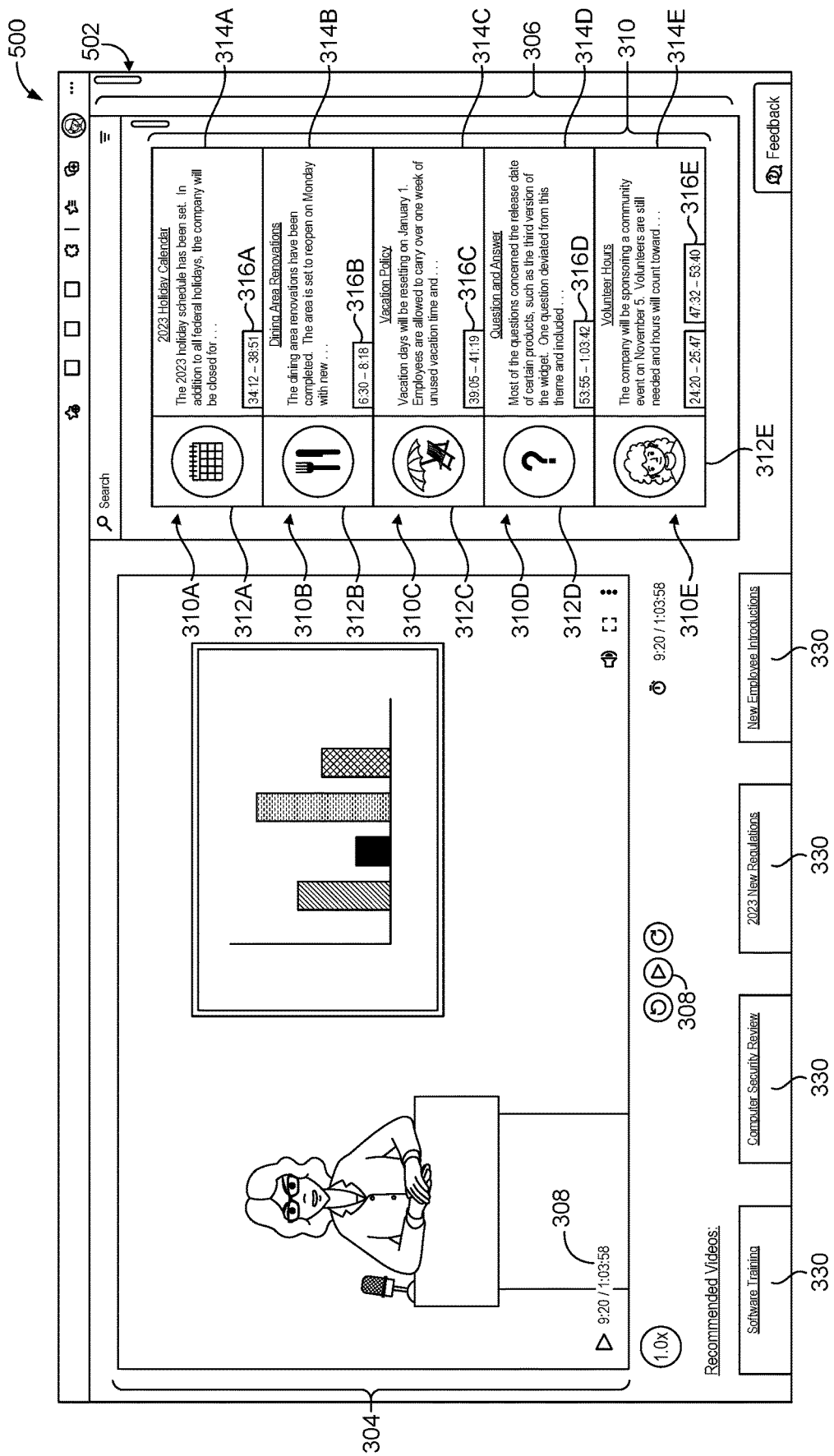
FIG. 5 illustratively depicts example schematic screenshots from a personal computing device showing aspects of an example GUI, in accordance with an embodiment of the present disclosure.

In one example, "section representation" refers to a GUI element or other media elements indicative of the content contained in the corresponding section of meeting. For example, the section representation may include an image, a text summary, or similar media format representation, as illustrated in FIGS. 3, 4, and 5. In one example, the section representation is determined for each section of a meeting based on a corresponding meeting feature specific to the meeting recording and/or a user feature specific to the user. In one example, the "meeting structure" refers to a logical organization by which the sections are organized. Example logical organizations include a hierarchical logical organization, a chronological logical organization, a speaker-indexed logical organization, a topic-indexed logical organization, a relevance ranked logical organization, or any other suitable logical organization relevant to the user. In one example, the section representations are organized (for example, relative to each other) based on the corresponding meeting structure.

In an example, as used herein, "meeting" refers to a gathering of one or more people that is at least partially hosted or supported by a computing application operating on a computing device (for example, mobile devices, laptops, desktops, computers, virtual-reality (VR) headsets, or user devices), such as a meeting application, video conferencing application, or collaboration application, and for which a user may interact by way of their client computing device. In one example, the meeting includes a hybrid meeting where a portion of attendees are participating in person, while another portion of attendees are participating via a client computing device as discussed above. For example, a meeting allows for meeting attendees to engage with each other or deliver content to other attendees at or near real-time. In some instances, the meeting is formatted to include a variety of media formats, including a visual presentation (such as presentation slides), audio (such as speed and background music), and so forth. Computer application software supporting meetings may also support additional features, such as a chat, a recording control, and so forth. On the other hand, "meeting recording," as used herein in an example, refers to a record of at least an aspect or portion of a meeting, such as an audio, video, or multimedia recording of a meeting. For example, a meeting recording corresponds to a stored copy of a meeting that has already occurred. In certain embodiments, the meeting recording may be automatically divided into sections, such that each or a portion of the total number of sections includes the section representations organized based on the meeting structures discussed herein.

By way of a non-limiting example, suppose a chief technology officer (CTO) viewing a meeting recording, such as an internal quarterly enterprise update, wants to easily access information relevant to her role within the organization. Meanwhile, suppose a student intern watching that same video wants to access information relevant to their end-of-summer school report. In this example, a computing system determines a section representation and/or meeting structure that is specific to the user (in this example, the CTO or the student intern) based on meeting features and/or users features. In this example, the section representation and meeting structure for the CTO is generated to include an image, a text summary, and time stamps for each section. Continuing this example, the section representation for the student intern is generated to include different images and different text summaries for different sections than that of the CTO. The different section representation and meeting structure of the student intern may be based on different meeting features and/or user features processed for the student intern as compared to the CTO.

Additionally, aspects of the present disclosure relate to technology for programmatically generating a GUI, such as the PNMR UI, that includes a player region and a section representation region. In one example, the player region includes a GUI element for displaying a meeting recording or live meeting. In one example, the section representation is separate from the player region on the PNMR GUI and includes indications corresponding to the section representations of the sections of the meeting recording. Although the meeting recording is similarly accessible by a plurality of users, in one example, the content in the section representation region is specific to a user, such that different users having access to the meeting recording may be presented with different section representations organized using similar or dissimilar meeting structures.

To determine the section representation and/or the meeting structure, this disclosure provides technologies to determine one or more meeting features based on meeting data associated with a meeting and to determine one or more user features based on user data associated with a user. In one embodiment, the section representation and/or the meeting structure is generated based on the meeting features that are generated based on meeting data, such as a transcript of audio in the meeting recording, a chat of the meeting recording, spoken words by the user, or a media format of the meeting recording.

In some embodiments, the section representations are ranked based on the meeting features and/or the user features. In one example, the section representation region limits the number of section representations that are generated on the section representation region of the PNMR UI. For example, the computer application that presents the PNMR UI and that is running on a mobile device may accommodate fewer section representations (due to a smaller screen size or a smaller screen-size-to-pixel-ratio) than a similar computer application running on a desktop or laptop device. Accordingly, the PNMR UI may include fewer section representations when generated on a mobile device than when generated on a laptop or desktop device. In one embodiment, the mobile device causes presentation of only the top-ranked n-number of section representations, where n is a real integer such as 1, 2, 3, 4 and so forth. In some embodiments, an order of the enriched meeting playback sub-timelines is based on the ranking.

Accordingly, the sections, the section representations, and/or the meeting structures may be personalized or user-specific. In some embodiments, the event of interest is determined based on a user profile defining meeting data, user settings/configurations, and the like.

Such technologies improve the user experience in any of a number of computer applications and platforms and reduce computational resources associated with a user causing unnecessary playback in an effort to manually find specific, relevant content. Instead, the embodiments disclosed herein improve the ability for a user to efficiently watch or re-watch a meeting recording without having to blindly navigate to different portions of the meeting recording without an indication of whether the different portions of the meeting recording will be relevant to the user. As such, network bandwidth associated with streaming meeting recordings may be saved and reallocated to other uses since the embodiments described herein point users to section representations associated with specific sections of the meeting recording and allow for easy navigation to the portion of the meeting recording corresponding to a specific section.

Overview of Technical Problems, Technical Solutions, and Technological Improvements As previously described, people spend significant time communicating with and in meetings with other people, including time collaborating or working in teams, and it can be helpful for a user to be provided a section representation of sections of the meeting recording determined to be relevant for a user. Additionally, the information contained in the section representation allows a user to briefly review the section representation before committing to playing back the corresponding section. For example, when a user has a meeting with or communicates with a team, it would be helpful to provide the user with tools for playing back the meeting recording in such a manner that enriched information is presented in a designated region (for example, in a meeting representation region separate from the player region playing back the recording) so that the user can make a more informed decision before toggling to a portion of the meeting recording. Similarly, it can be helpful for the enriched information presented in the meeting representation region to be specific to the user instead of generalized across different users, the implementation of which may be difficult to achieve in practice.

However, listening to recorded meetings is a time-consuming and inefficient process, especially where a user is only interested in reviewing certain information, but must listen to entire meetings because they do not know where to focus their attention on their review. In particular, existing conventional technologies lack computing functionality to determine and provide information that is organized and relevant to the user, nor does there exist computing functionality to empower viewers with personalized tools for toggling to the corresponding personalized portions of the meeting recording to improve user computing experiences. In particular, existing approaches provide a timeline corresponding to content being streamed, such that the timeline provides an indication, such as a timer corresponding to a time stamp of content being presented on a video. For example, a viewer views a video, during which the timing indication moves from left to right, where at the start of the video the timing indication is on the left and at the end of the video the timing indication is on the right. At most, the functionality associated with this approach includes allowing a user to toggle to a corresponding time in the video, for example, to 3 minutes from the start of a video. Unfortunately, this existing approach fails to provide any meaningful data beyond data indicative of a time stamp from the start of the meeting associated with content being presented to facilitate finding a portion of the meeting recording.

Alternatively, to access information covered during the meeting, users can be provided a written paper or presentation (such as presentation slides) to review contents after attending a meeting. In these instances, a user views the presentation slides or a meeting handout after the meeting; however, such an approach fails to provide the user with certain information that was orally discussed in association with a particular presentation slide and that was not included in the presentation slides or the meeting handout. In other words, the meeting handout or presentation slides may fail to account for discussions or commentary delivered over audio or video when the corresponding portion of the meeting handout or corresponding presentation slide was discussed. Additionally, the meeting handouts are not generally personalized for a user. A user is instead left to manually watch the entire video to try to identify target information that is not present in other forms of media (such as the presentation slides or corresponding written paper), and make manual notes of times of the video that may correspond to relevant sections of the meeting. Further compounding this problem, many companies and organizations do not have the infrastructure or computing logic in place to allow workers to manually tag the video so that the manual notes and the meeting are included in a single file. Therefore, certain existing approaches fail to provide a user personalized content captured using different forms of media (for example, visual or auditory media formats).

Accordingly, automated computing technology for programmatically determining, surfacing, and/or utilizing meeting data to determine the section representation and/or the meeting structure, as well as to generate the disclosed PNMR UI, as provided herein, can be beneficial for enabling improved computing applications and an improved user computing experience. Further, embodiments of this disclosure address a need that arises from a large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices. Further still, embodiments of this disclosure enable an improved user experience across a number of computer devices, applications, and platforms. Further still, embodiments described herein enable certain events of interest to be programmatically surfaced and presented without requiring computer tools and resources for a user to manually perform operations to produce this outcome. Even if a user wanted to manually determine the section representation and/or the meeting structure, existing computer infrastructure and logic does not allow the section representation and/or the meeting structure to be generated specific and personal to a particular user. In this way, some embodiments, as described herein, reduce or eliminate a need for certain databases, data storage, and computer controls for enabling manually performed steps by a person, to search, identify, assess, view a video, and configure (for example, by hard-coding) the section representation and/or the meeting structure for presentation to users, thereby reducing the consumption of computing resources, such as those associated with running an entire video so that a person can manually try to identify events of interest.

Additional Description of the Embodiments

Figure 1:
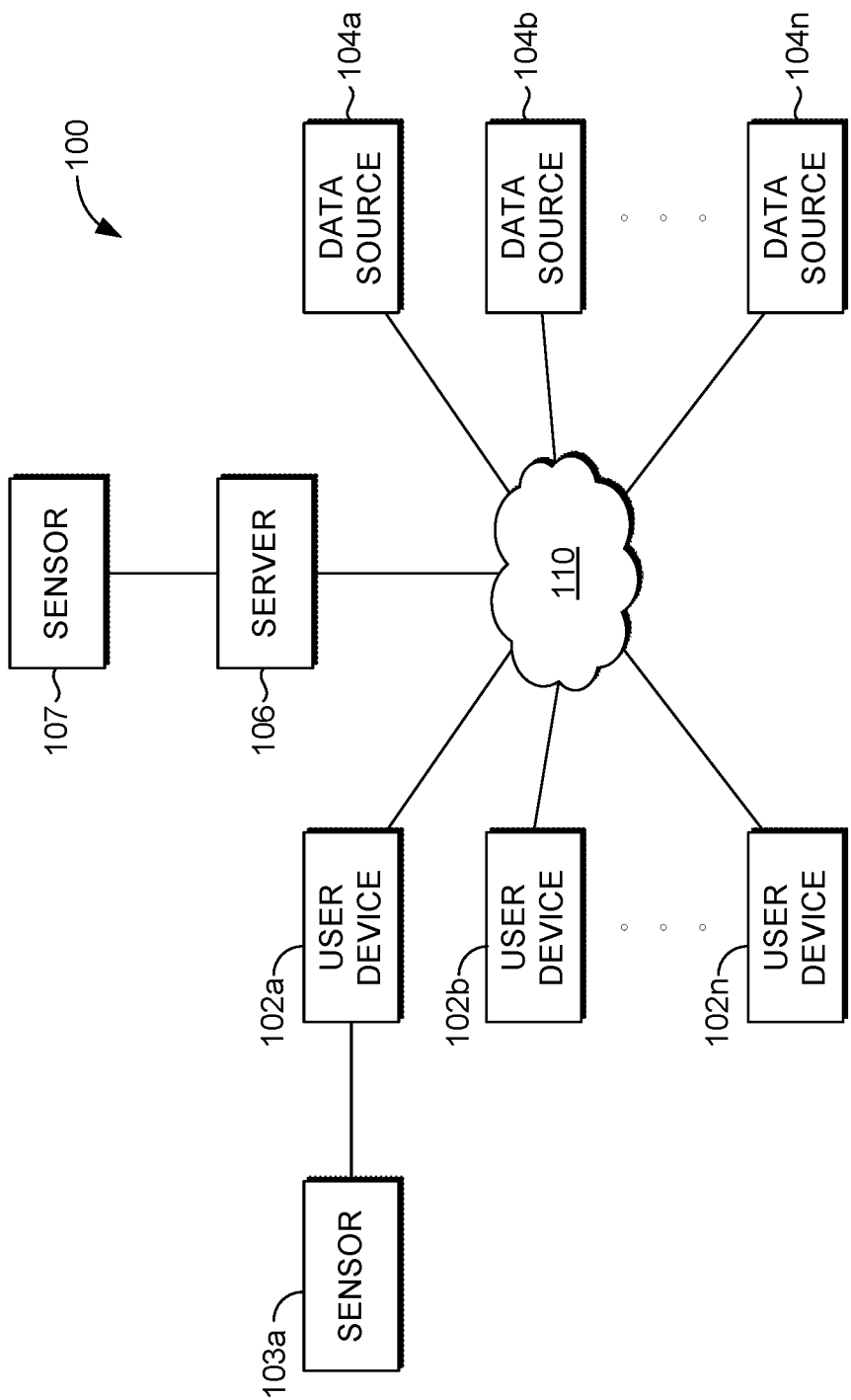
FIG. 1 is a block diagram of an example operating environment suitable for implementations of the present disclosure.

Turning now to FIG. 1, a block diagram is provided showing an example operating environment 100 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as: user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 900 illustrated in FIG. 9, for example. In one embodiment, these components communicate with each other via network 110, which includes, without limitation, one or more local area networks (LANs) and/or wide area networks (WANs). In one example, network 110 comprises the internet and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 1000 in FIG. 10. For instance, server 106 is provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a and 102b through 102n are the type of computing device described in relation to FIG. 9 herein. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In certain embodiments, data sources 104a and 104b through 104n comprise data sources and/or data systems, which are configured to make data available to any of the various constituents of operating environment 100 or system 200 described in connection to FIG. 2. For instance, one or more data sources 104a and 104b through 104n provide (or make available for accessing), to meeting-data collection component 210 of FIG. 2, meeting data. Data sources 104a and 104b through 104n may be discrete from user devices 102a and 102b through 102n and server 106 or may be incorporated and/or integrated into at least one of those components. In one embodiment, one or more of data sources 104a and 104b through 104n comprise one or more sensors, which are integrated into or associated with one or more of the user device(s) 102a, 102b through 102n or server 106. Examples of data made available by data sources

Figure 2:
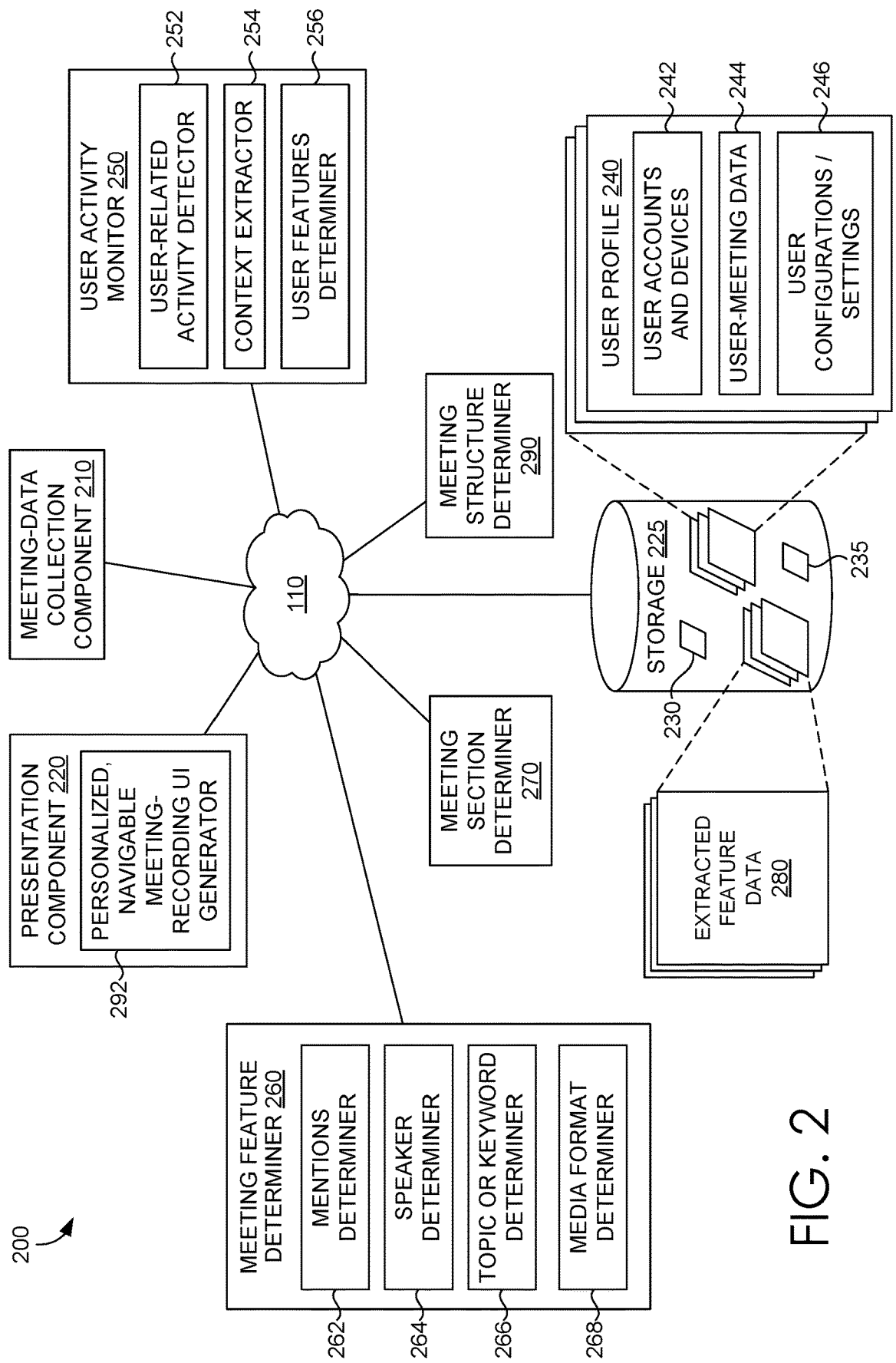
FIG. 2 is a diagram depicting an example computing architecture suitable for implementing aspects of the present disclosure.

104a, 104b through 104n are described further in connection to meeting-data collection component 210 of FIG. 2.

Operating environment 100 can be utilized to implement one or more of the components of system 200, described in FIG. 2, including components for collecting meeting data; monitoring user activity and/or receiving user preferences to determine meeting features and/or to determine user features; receiving similar categories of data regarding a meeting and a user's interactions within the meeting or the meeting recording to facilitate determining meeting features or user features; processing data, the meeting features, or the user features to determine and generate the sections of the meeting, the section representation of the section, or the meeting structure; and/or consuming or presenting a PNMR UI to users. Operating environment 100 can also be utilized for implementing aspects of methods 600, 700, and 800 in FIGS. 6, 7, and 8, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that are implemented as discrete or distributed components or in conjunction with other components, and in any suitable combination and location. In one example, the computing device of FIG. 9 and the distributed computing devices of FIG. 10 perform aspects of the system 200 of FIG. 2.

Example system 200 includes network 110, which is described in connection to FIG. 1, and which communicatively couples components of system 200. In the illustrated embodiment, the system 200 includes meeting-data collection component 210; presentation component 220; storage 225 storing user profile 240 and extracted feature data 280; user activity monitor 250; meeting feature determiner 260; meeting section determiner 270; meeting structure determiner 290; and PNMR UI generator 292. User activity monitor 250 (including its subcomponents 252, 254, and 256), meeting feature determiner 260 (including its subcomponents 262, 264, 266, and 268), meeting structure determiner 290, meeting-data collection component 210, and presentation component 220 may be embodied as compiled computer instructions or functions, program modules, computer software services, or an arrangement of processes carried out on one or more computer systems, such as distributed computing device 1000, described in connection to FIG. 10, for example.

In one embodiment, the functions performed by components of system 200 are associated with one or more computer applications, services, or routines, such as an online meeting application, a video-viewing application, a communications or collaboration application, or an organizational explorer application. The functions may operate to determine, without limitation, sections, section representations, and/or meeting structures specific to users based on extracted feature data 280. In particular, such applications, services, or routines may operate on one or more user devices (such as user device 102a) or servers (such as server 106).

Moreover, in some embodiments, these components of system 200 are distributed across a network, including one or more servers (such as server 106) and/or client devices (such as user device 102a) in the cloud, such as described in connection with FIG. 10, or reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), and so forth. Additionally, although functionality is described herein with regard to specific components shown in example system 200, it is contemplated that in some embodiments, functionality of these components can be shared or distributed across other components.

Continuing with FIG. 2, meeting-data collection component 210 is generally configured to access or receive (and in some cases also identify) meeting data, which may include data associated with a user (such as a user's pattern of viewing and engaging with media content or a user's data from a productivity application like an electronic calendar), data associated with a meeting, or data associated with a meeting recording from one or more data sources, such as data sources 104a and 104b through 104n of FIG. 1. In some embodiments, meeting-data collection component 210 is employed to facilitate the accumulation of data of a particular meeting, or data of a particular user or group (or in some cases, a plurality of users including crowdsourced data) for user activity monitor 250 or its subcomponents, meeting feature determiner 260 or its subcomponents, the meeting section determiner 270, or the meeting structure determiner 290. In one embodiment, the data is received (or accessed), and optionally accumulated, reformatted, and/or combined, by meeting-data collection component 210 and stored in one or more data stores such as storage 225, where it is available to other components of system 200. For example, the meeting data is stored in or associated with a user profile 240, as described herein, such as in user-meeting data 244 of user profile 240, or is stored in or associated with the storage 225. In some embodiments, any personally identifying data (for example, user data that specifically identifies particular users) is either not uploaded or otherwise provided from the one or more data sources, is not permanently stored, is de-identified, and/or is not made available to other components of system 200. In addition or alternatively, a user may opt into or out of services provided by the technologies described herein and/or select which meeting data or user data, and/or which sources of meeting data or user data are to be captured and utilized by these technologies.

Meeting data, in one example, comprises any information that is related to a meeting or meeting recording, and is generalized across users. User data, in one example, comprises any information that is related to a person and that person's preferences, including interactions during a meeting. In one example, user-meeting data refers to a combination of meeting data and user data. However, in some implementations, user-meeting data may also only include meeting data or only include user data. Meeting data and/or user data may be received from a variety of sources and available in a variety of formats. By way of example and without limitation, user-meeting data comprises at least one of: audio information (for example, an audio file having a recording of sound and spoken content from the meeting); transcript information (for example, a document having text that has been extracted out of a meeting based on audio of the meeting and/or a chat of the region); contact information (for example, email, instant message, phone, and so forth associated with meeting attendees or meeting invitees, and can also specify a person's communication preferences); location information (for example, a person's current location or location of a particular office where they work); presence; user-related activity, which may comprise activity relevant to a user or group of users, such as communications information (for example, past email, meetings, chat sessions, communication patterns or frequency, information about a user or other meeting attendees/invitees that the user had a meeting with or has an upcoming meeting with, or information about communications between a group member and one or more users), or files accessed (for example, a file created, modified, or shared), social media or online activity (such as a post to a social-media platform or website); subscription information; information regarding topics of interest to a user; or other user-related activity that may be determined via a user device (such as user device 102a of FIG. 1); task-related information (for example, an outstanding task that the user has with regard to a meeting or outstanding tasks that meeting attendees have with respect to the user); information about a group or group member that they may choose to share (for example, birthday, anniversary, and so forth); or information in common with the user (for example, common project teams, work groups, backgrounds, education, interests, or hobbies). Additional examples of user-meeting data are described herein.

In some embodiments, user-meeting data received via meeting-data collection component 210 is obtained from a data source (such as data source 104a in FIG. 1, which, in one example, corresponds to a meeting hosting site, a social networking site, a professional networking site, a corporate network, an organization's intranet or file share, or other data source containing user-meeting data) or determined via one or more sensors (such as sensors 103a or 107 of FIG. 1), which are on or associated with one or more user devices (such as user device 102a), servers (such as server 106), and/or other computing devices. As used herein, a sensor may include a function, routine, component, or combination thereof for sensing, detecting, or otherwise obtaining information such as user-meeting data from a data source 104a, and may be embodied as hardware, software, or both. By way of example and without limitation, user-meeting data includes data that is sensed, detected, or determined from one or more sensors (referred to herein as sensor data), such as location information of mobile device(s), properties or characteristics of the user device(s), user-activity information (for example: app usage; online activity; searches; voice data such as automatic speech recognition; activity logs; communications data, including calls, texts, chats, messages, and emails; document comments; website posts; other meeting data associated with communication events, including user history, session logs, application data, contacts data, calendar and schedule data, notification data, social-network data, e-commerce activity, user-account(s) data (which may include data from user preferences or settings associated with a personalization-related application, a personal assistant application or service, an online service or cloud-based account such as Microsoft 365, an entertainment or streaming media account, a purchasing club or services); global positioning system (GPS) data; other user device data (which may include device settings, profiles, network-related information, payment or credit card usage data, or purchase history data); other sensor data that is sensed or otherwise detected by a sensor (or other detector) component(s), including data derived from a sensor component associated with the user (including location, motion, orientation, position, user-access, user-activity, network-access, user-device charging, or other data that is capable of being provided by one or more sensor component); data derived based on other data (for example, location data that can be derived from Wi-Fi, cellular network, or IP address data), and nearly any other source of data that is sensed, detected, or determined as described herein.

User-meeting data, particularly in the form of context data or contextual information regarding a particular user, can be received by meeting-data collection component 210 from one or more sensors and/or computing devices associated with the user. In some embodiments, meeting-data collection component 210, user activity monitor 250 or its subcomponents, meeting section determiner 270, meeting feature determiner 260 or its subcomponents, or other components of system 200 determine interpretive data from received user-meeting data. Interpretive data corresponds to data utilized by the components or subcomponents of system 200 that comprises an interpretation from processing raw data, such as a transcript extracted from raw audio from the meeting or meeting recording, or topic information interpreted from a meeting recording, such as a chat of a meeting, a transcript, and so forth. Interpretive data can be used to provide context to user-meeting data, which can support determinations or inferences carried out by components of system 200. Moreover, it is contemplated that some embodiments of the disclosure utilize user-meeting data alone or in combination with interpretive data for carrying out the objectives of the subcomponents described herein. It is also contemplated that, in some instances, certain meeting data is processed by the sensors or other subcomponents of meeting-data collection component 210 not shown, such as for interpretability by meeting-data collection component 210. However, embodiments described herein do not limit the user-meeting data to processed data and may include raw data or a combination thereof, as described above.

In some respects, user-meeting data is provided in meeting data streams or signals. A "signal" can be a feed or stream of user-meeting data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a calendar service, an email account, a credit card account, or other data sources. In some embodiments, meeting-data collection component 210 receives or accesses data continuously, periodically, as it becomes available, or as needed. In some embodiments, the user-meeting data, which includes data indicative of the user's interactions during a meeting or while streaming a recording of the meeting, and which is received by meeting-data collection component 210, is stored in storage 225, such as in user-meeting data 244 or extracted feature data 280.

User activity monitor 250 is generally responsible for monitoring user activity for information that may be used for determining user-meeting data for one or more users. In some embodiments, user-meeting data associated with a particular user determined via user activity monitor 250 comprises contextual information. In some embodiments, this user-meeting data is utilized by other components of system 200 to infer an intent of the particular user and/or to further determine sections of the meeting recording, section representations for the sections, and/or a meeting structure for a particular user, which are used to generate the PNMR UI provided to the particular user, such as the PNMR UI 302, 402, 502 depicted in FIGS. 3, 4, and 5, respectively. In particular, embodiments of user activity monitor 250 determine user-meeting data associated with a particular user, which includes user-related activity data and/or context data, and/or provides the determined user-meeting data as structured data, such as one or more meeting features, so that it may be used by other components of system 200. For instance, as further described herein, the user-meeting data is used by meeting feature determiner 260 to determine meeting features used to determine sections of the meeting recording, section representations for the sections, and/or a meeting structure for a particular user. Accordingly, in some embodiments, user-meeting data determined by user activity monitor 250 or its subcomponents is used to determine contextualized sections of the meeting recording, contextualized section representations for the sections, and/or a contextualized meeting structure for a particular user. The user-meeting data determined by user activity monitor 250 or its subcomponents may also be stored in a user profile 240 associated with a user, such as in user-meeting data 244 of user profile 240, where it may be accessible to other components of system 200. Similarly, in some implementations, the features determined by meeting feature determiner 260, or its subcomponents, are stored in the storage 225 as extracted feature data 280, where it is accessible to other components of system 200.

In some embodiments, user activity monitor 250 determines current or near-real-time user activity information and also determines historical user activity information, which is determined based on gathering observations of user activity over time, accessing user logs of past activity (such as communication history, a user activity during a meeting, and the like, for example). Accordingly, user activity monitor 250 can determine current and historic user activity information that may be used by user activity monitor 250 or other components of system 200 to determine, for example, that: a meeting is taking place; a meeting has occurred; a user is listed as an invitee for a meeting; a user is listed as an attendee for the meeting; a role of a user within an organization (for example, CTO or student intern); a description of a meeting; a time and date during which the meeting is taking or took place; conferences or meetings in which the user spoke; and an indication that the particular user and the other users have attended meetings together, have similar interests or similar characteristics, have worked in the same office or location, or that the particular user and the other user share a connection with a third user.

In some embodiments, the user-meeting data determined by user activity monitor 250 (or its subcomponents) includes user-related activity information from one or multiple user devices associated with a user and/or from cloud-based services associated with a user (such as email, meeting information sources, calendars, social media, or similar information sources), and/or includes contextual information associated with the user activity or user-meeting data. For example, information about user activity on a particular device or cloud-based service is used to determine a context associated with the user, which is used for determining a section of the meeting recording, a section representation, and/or a meeting structure for displaying the PNMR UI to the user or providing the PNMR UI to a computing application or service. In an embodiment, user activity monitor 250 includes one or more computing applications or services that analyze information detected via one or more user devices used by a user and/or cloud-based services associated with the user to determine activity information and/or contextual information. Information about user devices associated with a user may be determined from the user-meeting data made available via meeting-data collection component 210, and may be provided to user activity monitor 250 or other components of system 200.

More specifically, in some implementations of user activity monitor 250, a user device is identified by detecting and analyzing characteristics of the user device, such as device hardware, software (such as operating system (OS)), network-related characteristics, user accounts accessed via the device, and similar characteristics. For example, information about a user device is determined by using functionality of many operating systems to provide information about the hardware, OS version, network connection information, installed application, or the like. The number of section representations that a user device may present may be based on the type of user device. For example, a mobile device presents fewer section representations or section representations with less information than section representations presented on a laptop device, at least because there is more screen size on the laptop device.

Some embodiments of user activity monitor 250 or its subcomponents determine a device name or identification (device ID) for each device associated with a user. This information about the identified user device(s) associated with a user may be stored in a user profile associated with the user, such as in user accounts and devices 242 of user profile 240. In an embodiment, a user device is polled, interrogated, or otherwise analyzed to determine information about the device. This information may be used for determining a label or identification of the device (for example, a device ID) so that user interaction with the device may be recognized from user-meeting data by user activity monitor 250. In some embodiments, users declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account (MSA), email account, social network, or the like, are identified and determined to be associated with the user.

As shown in example system 200, user activity monitor 250 comprises a user-related activity detector 252, context extractor 254, and user feature determiner 256. In some embodiments, user activity monitor 250, one or more of its subcomponents, or other components of system 200 determines interpretive data based on received user-meeting data, such as described previously. It is contemplated that embodiments of user activity monitor 250, its subcomponents, and other components of system 200 may use the user-meeting data and/or interpretive data for carrying out the objectives of the subcomponents described herein. Additionally, although several examples of how user activity monitor 250 and its subcomponents identify user-related activity information are described herein, many variations of user activity identification and user activity monitoring are possible in various embodiments of the disclosure.

User-related activity detector 252, in general, is responsible for determining (or identifying) that a user action or user-activity event has occurred. Embodiments of user-related activity detector 252 are used for determining current user activity or historical user actions. Some embodiments of user-related activity detector 252 monitor meeting data for activity-related features or variables corresponding to various user activity such as indications of user inputs into a chat, locations or visits, information about meetings attended, identities of speakers in the meeting, applications launched or accessed, files accessed or shared, websites navigated to, media played, or similar user activities. Additionally, some embodiments of user-related activity detector 252 extract, from the user-meeting data, information about user-related activity, which includes current user activity, historical user activity, and/or related information such as context.

Alternatively, or in addition, in some embodiments, context extractor 254 determines and extracts context. Similarly, in some embodiments, user feature determiner 256 extracts information about a user and/or a meeting, such as user features or meeting features, based on an identification of the activity determined by user-related activity detector 252. Examples of extracted user-related activity information include user location, app usage, online activity, searches, communications (such as chat, call, or message information), types of meetings attended (including the duration of meeting, topics of the meeting, and speakers of the meeting), usage duration, application data (for example, emails, meeting invites, messages, posts, user status, notifications, and so forth), or nearly any other data related to user interactions with the user device or user activity via a user device. For example, a user's location is determined using GPS, indoor positioning (IPS), or similar communication functionalities of a user device associated with a user.

Data determined from user-related activity detector 252 may be provided to other subcomponents of user activity monitor 250 or other components of system 200, or may be stored in a user profile associated with the user, such as in user-meeting data 244 of user profile 240. In some embodiments, user-related activity detector 252 or user activity monitor 250 (or its other subcomponents) perform conflation on detected user-meeting data. For example, overlapping information is merged and duplicated, or redundant information is eliminated.

In some embodiments, the meeting features are interpreted to determine that particular user activity has occurred. For example, in some embodiments, user-related activity detector 252 employs user-activity event logic, which includes rules, conditions, associations, classification models, or other criteria to identify user activity. In one embodiment, user-activity event logic includes comparing user activity criteria with the user-meeting data in order to determine that an activity event has occurred. Similarly, activity event logic may specify types of detected user-device interaction(s) that are associated with an activity event, such as navigating to a portion of a meeting recording, focusing a user's vision on a particular portion of a screen, user inputs, downloading meeting recordings, or launching an application. In some embodiments, a series or sequence of user device interactions is mapped to an activity event, such that the activity event is detected upon determining that the user-meeting data indicates that the series or sequence of user interactions has been carried out by the user.

In some embodiments, user-related activity detector 252 runs on or in association with each user device for a user. User-related activity detector 252 may include functionality that polls or analyzes aspects of the operating system to determine user activity related features (for example, installed or running applications or file accesses and modifications), network communications, and/or other user actions detectable via the user device including sequences of actions.

Context extractor 254 is generally responsible for determining a context associated with user-related activity or user-meeting data. As further described herein, a context (or context logic) may be used to determine a section, section representation, or meeting structure, to assemble or format the section representation for each section on a PNMR UI for presentation to a user, or for consumption by a computing application. By way of example, a context comprises information about a user's current activity, such as application usage, meeting recording consumption time, communication or interaction during a meeting or while watching a meeting recording; and/or a user's interaction with a chat, a text window, or other suitable interactions. For instance, a context can indicate types of user activity, such as a user attending or scheduling a meeting, sending a message (to the entire audience chat or directly to one or more other users), or viewing a meeting recording. Alternatively, or in addition, a user may explicitly provide a context, such as performing a query for a particular topic or meeting, which may be performed via a meeting hosting application, an organizational explorer application, and the like. In one embodiment, a context includes information about a meeting or meeting recording with which the user is interacting or accessing information about, as in where a user hovers their mouse over an indication of a meeting, meeting recording, or other suitable GUI elements.

Some embodiments of context extractor 254 determine context related to a user action or activity event, such as people entities identified in a user activity or related to the activity (for example, recipients of a message or chat sent by the user, which is sent to an alias corresponding to the audience or meeting attendees), which includes nicknames used by the user (for example, "boss" and "classmate," referring to specific entities identified in the user's contacts by their actual names, or group names such as "project team" or "executive team," which refer to specific groups of people identifiable from user-meeting data), and utilize a named-entity extraction model or named-entity recognition model. Context extractor 254 may also determine information related to a section or a target meeting structure, which may include information about a user's focus on previous meeting recordings or previous sections determined for prior meetings attended by the particular user. By way of example and without limitation, this includes context features such as: meeting-attendee data; meeting-invitee data; contextual information about a type of meeting; other information about the meeting recording such as a description of the meeting, topics covered by the meeting, and so forth; information detected by sensor(s) on user devices associated with the user that is concurrent or substantially concurrent to the detected user activity; or any other data related to the user activity that is detectable and used for determining a context of the user-related activity.

In some embodiments, context extractor 254 comprises one or more applications or services that parse or analyze information detected via one or more user devices used by the user and/or cloud-based services associated with the user to identify, extract, or otherwise determine a user-related or user-device-related context. Alternatively, or in addition, some embodiments of context extractor 254 may monitor user-meeting data, such as that received by meeting-data collection component 210 or determined by user-related activity detector 252, for information that may be used for determining a user context. In some embodiments, this information comprises features (sometimes referred to herein as "variables") or other information regarding specific user-related activity and related contextual information.

Some embodiments of context extractor 254 determine, from the monitored user-meeting data, a user context associated with a particular user, user device, or a plurality of users (such as a specific group of people, a group of people sharing a role within an organization, a student, a professor, or faculty) and/or user devices. In some embodiments, a user context determined by context extractor 254 is provided to other components of system 200 or stored in a user profile 240 associated with a user, such as in user-meeting data 244 of user profile 240, where it is accessed by other components of system 200.

User feature determiner 256 is generally responsible for determining or extracting one or more user features (or variables) characterizing the user or the user's information relative to a meeting, and/or for determining structured user-meeting data associated with a user or meeting. User features may be determined from information about user-meeting data received from meeting-data collection component 210 or from user-related activity data, which may include context data determined by user activity monitor 250. In some embodiments, user feature determiner 256 receives information from one or more of these other components of system 200 and processes the received information to determine one or more user features or meeting features that are specific to a user. For example, user-meeting data processed by the user feature determiner 256 comprises unstructured, semi-structured, or structured data about a user (or other users). In some embodiments, this received user-meeting data is converted into a structured data schema or record, a feature vector, one or more data feature-value pairs, or other data record that is usable for determining a section, a section representation for the section, or a meeting structure. In one embodiment, the user features or structured user-meeting data determined by the user feature determiner 256 is provided to other components of system 200 or stored as extracted feature data 280 or stored in a user profile associated with a user, such as in user-meeting data 244 of user profile 240, where it may be accessed by other components of system 200.

Examples of user features determined or extracted by feature determiner 256 include, without limitation: data from information sources associated with the user, such as an organizational chart or employment data (for example, who a user reports to, works with, manages (or who reports to a user)); a user's role; information about project team(s), which can include project-team members, or similar information; social media or social collaboration information sources (for example, the user's LinkedIn® connections or GitHub® contributions or collaborations); location-related features; venue-related information associated with the location or other location-related information; other users present at a venue or location; time-related features; current-user-related features, which include information about the current or recent user of the user-device; user device-related features, such as device type (for example, desktop, tablet, mobile phone, fitness tracker, heart rate monitor, or other types of devices), hardware properties or profiles, OS or firmware properties, device IDs or model numbers, network-related information, position/motion/orientation-related information about the user device, network usage information, app usage on the device, user account(s) accessed or otherwise used (such as device account(s), OS level account(s), or online/cloud-service related account(s) activity, such as Microsoft® MSA account, online storage account(s), email, calendar, meetings, or social networking accounts); content-related features, such as meeting topics, presentations, a text transcript of the meeting (that is correlated to a timing or duration of the meeting, a speaker of the meeting, or topic), or attendees; user activity, such as verbal commands, annotations to the meeting recording, searches, browsed websites, purchases, social networking activity, communications sent or received including social media posts; or any other features that are detected or sensed and used for determining data associated with or characterizing a user or meeting. Any other user-specific features are also alternatively or additionally possible.

Some embodiments of feature determiner 256, or more generally user activity monitor 250, can determine interpretive or semantic data from the user-meeting data, which is used to determine user features or other structured user data. For example, while a user-activity feature indicates a location visited by the user, a semantic analysis determines information about the location, such as that the location is a gym, a coffee house, or a company office, or to determine other data associated with detected user activity or user data. Thus, semantic analysis may determine additional user-activity related features or user data that is semantically related to other data and which may be used for further characterizing the user or for determining a context.

In one embodiment, a semantic analysis is performed on at least a portion of the user-meeting data to characterize aspects of the user-meeting data. For example, in some embodiments, user-related activity features are classified or categorized (such as by type, time frame or location, work-related, home-related, themes, related entities, other user(s) (such as communication to or from another user) and/or relation of the other user to the user (for example, family member, close friend, work acquaintance, boss, or the like, or other categories), or related features are identified for use in determining a similarity or relational proximity to other user-related activity events. In some embodiments, a semantic analysis utilizes a semantic knowledge representation, such as a relational knowledge graph. A semantic analysis may also utilize semantic analysis logic, including rules, conditions, or associations to determine semantic information related to a user activity. For example, a user-related activity event comprising a message sent to another meeting attendee during the meeting is characterized as a work-related activity, which is used to infer a relationship that the user works with the message recipient. A semantic analysis may also be used to further determine or characterize a context, such as determining that a topic of a meeting that has been watched by the user is associated with user-related activity that corresponds to a topic of interest based on time spent or frequency the user has accessed the meeting recording or portion of the meeting recording. For example, the user's topic of interest is determined (using semantic analysis logic) to be the topic of the meeting recordings the user has spent the most time watching. Similarly, the semantic analysis may determine other suitable events of interest.

Continuing with FIG. 2, meeting feature determiner 260 is generally responsible for determining the meeting feature and corresponding time (for example, a start time that the meeting feature started and an end time at which the meeting feature ended during the meeting or meeting recording) based on user-meeting data. In one example, the meeting feature is specific to the meeting recording and is shared across viewers (for example, the users). In one embodiment, the meeting feature determiner 260 accesses user-meeting data 244 of the meeting recording from the storage 225 to determine the meeting features. Embodiments of meeting feature determiner 260 determine and generate a meeting feature and associated event time based on the user activity monitor 250, the meeting-data collection component 210, and or the user profile 240. Thus, in one example, information about a meeting feature to be generated is received from the user activity monitor 250 or the user-meeting data 244 in storage 225. In one embodiment, the meeting feature and associated data as generated and determined by the meeting feature determiner 260 (or its subcomponents) is stored as extracted feature data 280, where it is used by other components or subcomponents of system 200, such as the meeting section determiner 270, meeting structure determiner 290, and the personalized navigable meeting (PNM) UI generator 292. In one example, a meeting feature determined by meeting feature determiner 260 is provided to the meeting section determiner 270 to determine a section of the meeting recording and corresponding section representation, and/or is provided to the meeting structure determiner 290 to determine a corresponding meeting structure, and/or is provided to the PNMR UI generator 292 to generate the PNMR UI. In some embodiments, the meeting feature determined by meeting feature determiner 260 (or its subcomponents) comprises one or more meeting features, each identifying and classifying content associated with a section of the meeting recording.

Embodiments of meeting feature determiner 260 determine the meeting feature. In one embodiment, the meeting feature determiner 260 determines the meeting feature for a section determined by the meeting section determiner 270. In another embodiment, the meeting feature determiner 260 determines the meeting feature and provides the meeting feature for the meeting section determiner 270 to determine a section. As described above, in one example, the meeting feature is specific to a section or a meeting recording, is shared across users, or is generic across users. For example, the meeting recording has similar meeting features for the various users who view or listen to the meeting recording. Embodiments of meeting feature determiner 260 determine the meeting feature based on: data associated with the meeting or meeting recording; data associated with a particular user, such as a user interacting (for example, inputting text such as a chat message, uttering a voice command, making a selection, or another user interaction) via a GUI during the meeting or after the meeting while viewing the meeting recording or other meeting recordings (such as a related meeting recording that is part of a larger series of meeting recordings); or a combination thereof. In one embodiment, meeting feature determiner 260 is provided with data about a particular user and/or data about the meeting or meeting recording, both of which are received from or determined from the user data determined by user activity monitor 250, meeting-data collection component 210, or from one or more user profiles 240. In one example, user-meeting data 244 associated with a particular user and/or meeting is utilized to determine that user's context or indicate that user's intent, as described previously, such that a meeting feature is determined by meeting feature determiner 260 using this user-meeting data and based on the user's context or intent.

Some embodiments of meeting feature determiner 260 utilize meeting feature determination logic 230 to determine a meeting feature to provide the meeting section determiner 270, the meeting structure determiner 290, and/or the PNMR UI generator 292. In one embodiment, meeting feature determination logic 230 comprises computer instructions including rules, conditions, associations, predictive models, classification models, or other criteria for, among other operations, determining a meeting feature (determined by the meeting section determiner 270), indexing the sections, or contextualizing the sections for a user. Meeting feature determination logic 230 may take different forms, depending on the particular information items being determined, contextualized, or processed for relevance, and/or based on user-meeting data or data indicating a context. For example, meeting feature determination logic 230 comprises any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these to determine (or facilitate determining) the meeting feature according to embodiments described herein.

In some embodiments, the meeting feature determiner 260 indexes and stores (in storage 225) the meeting features to facilitate other components of the system 200 in retrieving the meeting features. In this manner, the meeting section determiner 270 can determine the section; the meeting structure determiner 290 can determine the corresponding meeting structure; and/or the PNMR UI generator 292 can generate the PNMR UI. In one embodiment, the meeting feature is indexed and used to generate the sections of the meeting recording. For example, as illustrated in FIG. 3, a plurality of section representations 310 are generated, such that the section representations correspond to different sections of the meeting recording. In the example depicted in FIG. 4, the PNMR UI 402 includes an expanded, more detailed view of the section representation 310A.

In some embodiments, the meeting feature determined by meeting feature determiner 260 (which is determined using meeting feature determination logic 230) is based on explicit or inferred information about the meeting, the meeting recording, and/or the user(s). For example, meeting feature determination logic 230 includes logic specifying instructions for detecting explicit information about the meeting or meeting recording, determining an event time of the explicit information, or similarly for inferring a meeting feature based on particular user-meeting data, such as particular data associated with the meeting or meeting recording. Without limitation, examples of explicit information about the meeting or meeting recording can comprise a general topic of the meeting, a list of speakers from the meeting, a list of topics discussed, languages in which the meeting was delivered, and so forth. Examples of inferred data associated with the meeting feature comprise a relevancy of the meeting to the user or to a role associated with the user (and shared with other users), or the frequency, rate, or count of views of the meeting recording, or a level of user engagement with the meeting (such as, whether the user spoke, presented, asked a question, engaged in the chat, and so forth).

In some embodiments, the meeting feature determiner 260 associates a meeting feature to a corresponding segment or set of segments. In one example, associating the meeting feature to a segment or set of segments includes determining a start time and an end time associated with the meeting feature; determining whether the start time and the end time associated with the first meeting feature overlaps with a start time and an end time associated with the first section; and based on a level of overlap between (1) the start time and the end time associated with the first meeting feature and (2) the start time and the end time associated with the first section, correlating the first meeting feature with the first section.

Some embodiments of meeting feature determination logic 230 comprise a plurality of logic for classifying various types of meeting features to determine the type(s) or category(ies) of a meeting feature, and/or include corresponding logic for determining the relevance of each type/category of meeting features. By way of example and without limitation, categories of meeting features determined by meeting feature determiner 260 (which employs meeting feature determination logic 230, in some embodiments) can comprise: information indicative of a person being mentioned, such as a person being ranked higher than the user who is viewing or listening to the meeting recording (such as a company chief operating officer (CEO) being ranked higher than a company chief technology officer (CTO), who is watching the meeting recording); information that a particular speaker is speaking; information of a topic of interest or keywords or phrases being identified, such as the words or phrases "important," "crucial," "emphasize," "please listen," or "dollars", or any word inferred to be relevant to a user; information of a question being asked, as identified by determining the use of "who," "what," "where," "when," or any other question-promoting words or phrases; information regarding a meeting format, such as whether the meeting includes audio, visual content, or both; and/or so forth; and the like. Additionally, in one example, the meeting features (or another category) are programmatically generated, ranked, or determined for relevance to the user, a group of users, or an organization or enterprise, according to the meeting feature determination logic 230. For example, a meeting feature is automatically determined by detecting a mention of a particular person (for example, the CEO of the enterprise), the start of the session of a particular speaker, a keyword mention, a question being asked, and the like. One example illustratively depicting section representations 310 generated in accordance with a meeting structure and determined based on meeting features determined by the meeting feature determiner 260 (which uses meeting feature determination logic 230) is provided in FIG. 3. However, it should be understood that the section representations of FIG. 3 may also be generated additionally or alternatively based on users features (determined by the user features determiner 256).

Further, in some embodiments, the dedicated subcomponent utilizes meeting feature determination logic 230 that is specific for classifying the meeting feature to determine the particular category of the meeting feature. For instance, as shown in example system 200, meeting feature determiner 260 comprises mentions determiner 262, speaker determiner 264, topic/keyword determiner 266, and media format determiner 268. In one embodiment, the meeting feature is determined by mentions determiner 262, speaker determiner 264, topic/keyword determiner 266, and/or the media format determiner 268, as described herein.

Mentions determiner 262, in general, is responsible for determining user-meeting data that comprises a person or entity being mentioned during the meeting. In one embodiment, the user-meeting data is used to determine a meeting feature indicating that a particular person or entity was mentioned during the meeting either through an uttered word or visual content, such as text indicative of a name included on a slide of a presentation. For example, the mention of the person or entity includes, without limitation, instances during the meeting when a speaker uttered the name or identity of the person or entity, such as when the speaker uttered the name of the user or any person determined to be of interest to the users, such as the enterprise CEO. Alternatively, in one example, the mentions includes visual content corresponding to text (in a presentation) indicative of the name or identity of a person or entity. For example, mentions include a mention of a person or entity by someone other than the speaker via any suitable type of communication or media format, such as live in-meeting chats, post-meeting question-and-answer sessions, visual text, visual content (for example, identified using object detection methodologies), or pre-meeting chat sessions. The user-meeting data is received, for example, from user activity monitor 250, meeting-data collection component 210, or from storage 225.

In some embodiments, a meeting feature including a mention of a person or entity is determined by mentions determiner 262 and ranked for relevance so that mentions that are more relevant are given priority and/or provided over mentions that are less relevant. For example, meeting feature determination logic 230 is used to determine relevance of a meeting feature to a particular user, a group of users, or an enterprise; determine a time (for example, start and/or end time) of the meeting feature; as well as score or rank the meeting features for relevance. In one example, relevance is determined based on any number of criteria such as, without limitation, freshness (or how recently the mentioned occurred); the number of times any name or entity was mentioned during the meeting (for example, as determined by processing a transcript of the meeting); or the importance of the person or entity that was mentioned relative to the user, a group of users, or the enterprise.

Speaker determiner 264, in general, is responsible for determining the identity of the speakers presenting content during the meeting or an author or creator of content included during the meeting. For example, a speaker might include a person who spoke for more than a threshold amount of time, such that those speakers who do not speak for a duration exceeding the threshold amount of time are not classified as speakers and instead are classified as people interrupting a meeting by asking questions or clarifying a point made by the speaker. Embodiments of speaker determiner 264 can process user-meeting data associated with the meeting or meeting recording to determine a speaker. In some embodiments, user-meeting data (such as communications data from a meeting or meeting recording (for instance, patterns of communication by the various speakers), location of the meeting, relationship data indicative of a relationship between the speaker and the user watching or listening to the meeting, which is determined from an organizational chart or contacts list, or other user-meeting data) is processed to determine a speaker. For example, meeting features are compared to determine a speaker, such as by performing a comparison of meeting features that comprise information regarding the speaking tempo and identity of speakers listed in an agenda providing information of the meeting. Specifically, a comparison operation can be performed to determine those different speaking patterns, which can indicate an instance of different speakers in a meeting. The user-meeting data, that is utilized by speaker determiner 264, is received, for example, from user activity monitor 250 (or a subcomponent, such as user feature determiner 256), meeting-data collection component 210, or storage 225.

Embodiments of speaker determiner 264 utilize meeting feature determination logic 230 to determine a speaker's identity used as a meeting feature. According to one embodiment, speaker determiner 264 processes user-meeting data to determine a speaker of a meeting according to the following method. First, one or more speakers/people that were listed in a meeting description (such as an introductory slide of a presentation, an agenda in a pamphlet, or information associated with a corresponding electronic calendar entry) or that were identified during the meeting may be identified. In some embodiments, the speakers are ranked based on the duration of time a corresponding speaker spent speaking or the frequency with which the speaker spoke, or based on a role of the speaker relative to a user, a group of users, or an organization. Further, some embodiments consider communications or interactions having at least a threshold time duration, such as portions of the meeting exceeding two minutes having a common speaker.

Topic/keyword determiner 266, in general, is responsible for determining specialized information of the meeting, such as topics covered during a corresponding section of the meeting or keywords provided during the meeting or meeting recording. Embodiments of topic/keyword determiner 266 determine explicit usage of keywords or inferred topics covered by a speaker and used to determine a section (by the meeting section determiner 270), used to determine the corresponding meeting structure (by the meeting structure determiner 290); and/or used to generate the PNMR UI (by the PNMR UI generator 292). For instance, a user (or an administrator) creates a list of topics or specifies content keywords that are relevant. Alternatively or in addition, the keywords or topics are automatically generated by the topic/keyword determiner 266, for example, based on user-meeting data 244. Some embodiments use user-meeting data to determine content from which topic/keyword determiner 266 can infer topics and/or keywords that are used to determine a section (by the meeting section determiner 270), used to determine the corresponding meeting structure (by the meeting structure determiner 290); and/or used to generate the PNMR UI (by the PNMR UI generator 292). Alternatively, once the section is determined, according to an embodiment, topic/keyword determiner 266 performs a topic analysis operation (or topic detection, topic modeling, or topic extraction) to determine one or more topics from the section. In some embodiments, the frequency or recency of topic(s) determined by the topic analysis is determined such that those topics occurring frequently or recently are determined to be meeting features.

In some embodiments, a computer application or service for identifying topics associated with particular people is used to determine topics associated with speakers. In one embodiment, from the topics determined to be associated with speakers, those topics occurring most often are determined as meeting features. One such example of a computer application or service for identifying topics associated with particular people is Microsoft Viva™ Topics. Some embodiments of topic/keyword determiner 266 can determine topics or keywords that are relevant based on meeting feature determination logic 230 and/or based on user-meeting data associated with a meeting or meeting recording, as described herein.

In some embodiments, the topic/keyword determiner 266 is responsible for determining questions being asked during the meeting, either by the speaker or an attendee or other person from the audience. Examples of questions determined by topic/keyword determiner 266 comprise, without limitation, at least one of: a portion of a speaker's presentation in which the speaker's speaking tempo changed; certain words being identified, such as words like "question," "who," "what," "where," "when" and the like, as well as the phrases following these words; and the like. Embodiments of topic/keyword determiner 266 determine an inquiry from a chat or other communication other than the speaker. For example, the topic/keyword determiner 266 analyzes a chat or corresponding transcript to determine times in the meeting during which an audience or speaker asked a question. In another example, the topic/keyword determiner 266 may access video frames, employ optical character recognition (OCR) to determine alphanumeric characters in the frame, and extract a topic or keywords from the frame, and associate the extracted topic or keywords to the frame and/or timestamp.

In some embodiments, the topic/keyword determiner 266 associates the question asked with when the question was answered. For example, when a meeting attendee asked a question in a chat at minute 25, and the speaker answered the question at minute 35 (for example, after reading the chat), the topic/keyword determiner 266 associates the question (from minute 25) to the later associated answer (from minute 35). In one example, the topic/keyword determiner 266 associates a question and an answer based on a comparison of the topic associated with the question and a topic associated with candidate answers. In one embodiment, the topic/keyword determiner 266 employs any suitable rules (which include static or predefined rules defined by the meeting feature determination logic 230), Boolean logic, decision trees (for example, random forest, gradient boosted trees, or similar decision algorithms), conditions or other logic, a deterministic or probabilistic classifier, fuzzy logic, neural network, finite state machine, support vector machine, logistic regression, clustering, machine learning techniques, similar statistical processes, or combinations of these.

Media format determiner 268, in general, is responsible for determining one or more forms or media formats of the meeting recording. For example, the media format determiner 268 determines whether the meeting recording includes visual content (such as presentation slide(s), people, visual indications of text, props, visual transitions, and so forth) and/or audio content (such as music, a speech, background noise, and the like). In one embodiment, the determination is based on meeting feature determination logic 230. In one example, the media format determiner 268 determines that the meeting recording includes audio content indicative of a speech or other sound-delivered communication and then employs a natural language processing (NLP) methodology to determine text parameters. Text parameters, for example, include a count of words; punctuation marks, such as commas, periods, exclamation points, colons, and other grammar marks extracted by the media format determiner 268 from a transcript of audio or a raw audio file; vowels; consonants; spaces; and so forth. In one embodiment, the media format determiner 268 determines metadata about a format in which a section is presented. For example, the media format determiner 268 determines that the section includes presentation slides, background music, audio from a speaker delivering audio content, and/or any other suitable metadata. Other example metadata includes information about the author, the message type, post date and time, versions, links (un-shortened), location, and comments.

Continuing with example system 200 of FIG. 2, meeting section determiner 270 is generally responsible for determining continuous portions of the meeting recording that share common characteristics, based on the meeting features, to classify those continuous partitions as sections. In particular, embodiments of meeting section determiner 270 determine at least one section having a duration defined between a start and end time. In one example, the meeting section determiner 270 determines the section based on the user features (determined by the user feature determiner 256) and/or the meeting features (determined by the meeting feature determiner 260). In some embodiments, data associated with the meeting features is received from meeting feature determiner 260 (or its subcomponents) or from extracted feature data 280; and/or data associated with the user features is received from the user activity monitor 250 (for example, the user feature determiner 256), from the user profile 240, or from extracted feature data 280.

In one embodiment, the meeting section determiner 270 determines the section as part of a post-processing process of storing the meeting. After the meeting ends, the meeting is stored, for example, in storage 225. The section determiner 270 may access the meeting to begin post-processing. Alternatively, in some embodiments, the post-processing process is initiated or performed by any other component of FIG. 2, such as, but not limited to, the meeting-data collection component 210, the user activity monitor 250, the meeting feature determiner 260, and so forth.

In some embodiments, user-meeting data associated with a particular user, which indicates that user's context and/or intent when interacting with a meeting or meeting recording, is used by meeting section determiner 270 to determine the section for the user. Thus, meeting section determiner 270 also may receive user-meeting data for a user and/or meeting from user activity monitor 250 (or its subcomponents), meeting-data collection component 210, or a user profile 240. Further, in some embodiments of meeting section determiner 270, the section representation and/or the meeting structure are determined based on the user-meeting data associated with the user, such as described herein.

In one example, the meeting section determiner 270 determines a section by determining a contiguous portion of the meeting recording having a common meeting feature, which includes at least one of an indication of: a speaker, a topic, an audio content, a visual content, a relevance weight, a media type, or a meeting attendee. Continuing this example, the meeting section determiner 270 determines the section by further determining a start time of the contiguous portion of the meeting recording that corresponds to a first change of the common meeting feature; determining an end time of the contiguous portion of the meeting recording that corresponds to a second change of the common meeting feature; and determining or classifying the section of the meeting recording as the contiguous portion of the meeting recording from the start time to the end time.

In some embodiments, the meeting section determiner 270 determines a section based on the meeting feature determiner 260 (or its subcomponents). For example, the meeting section determiner 270 receives an indication of a mention from the mentions determiner 262, such that the section corresponds to the portion (defined between a start and end time) of the meeting recording sharing characteristics with the mention determined from the mentions determiner 262. In some embodiments, whether characteristics are shared is based on an analysis of the portions of the meeting recording surrounding the identified mention, and/or is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a section includes the portion of the meeting recording covering the mentioned topic or person, and related content.

As another example, the meeting section determiner 270 receives an indication of a speaker from the speaker determiner 264, such that the section corresponds to the portion of the meeting during which the determined speaker speaks or delivers content. The section during which the speaker speaks or delivers may have a duration defined between a start time (during which the speaker begins speaking) and an end time (at which the speaker stops speaking or speaks a transition word, such as "thank you," "I now pass the presentation to," and so forth). In some embodiments, the meeting section determiner 270 determines the section based on a portion of audio sharing sound parameters with the voice of the speaker determined by the speaker determiner 264 and/or the media format determiner 268. In some embodiments, whether the sound parameters are shared with a voice of the speaker is based on an analysis of the portions of the meeting recording surrounding the identified mention, and/or is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a section includes the portion of the meeting recording covering the mentioned topic or person, and related content.

As another example, the meeting section determiner 270 receives an indication of a keyword or topic from the topic/keyword determiner 266, such that the section corresponds to the portion (defined between a start and end time) of the meeting recording sharing characteristics with the keyword, topic, or question determined by the topic/keyword determiner 266. In some embodiments, whether characteristics are shared is based on an analysis of the portions of the meeting recording surrounding the identified keyword or the portions covering the determined topic. In some embodiments, whether characteristics are shared is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. In one embodiment, a section includes the portion of the meeting recording covering a topic (for example, engineering updates within the enterprise; or portions covering legal updates within the enterprise). In this manner, the sections determined for one user (for example, the engineer) may differ from the sections determined for another user (for example, the lawyer) based on the topics that are of interest to a user based on the respective user-meeting data.

As another example, the meeting section determiner 270 receives an indication of a media format from the media format determiner 268, such that the section corresponds to the portion (defined between a start and end time) of the meeting recording sharing characteristics with the media format determined from the media format determiner 268. For example, the section determined by the meeting section determiner 270 includes a section defined between when a particular presentation slide was presented to when the particular presentation slide was changed. In some embodiments, whether characteristics are shared is based on an analysis of the portions of the meeting recording surrounding the identified media format, and is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a section includes the portion of the meeting recording sharing a characteristic of the media format, such as a slide, a speaker's face talking, and so forth.

In some embodiments, the meeting section determiner 270 is additionally or alternatively generally responsible for determining a section representation for each determined section. In one embodiment, the meeting section determiner 270 determines the section representation based on the meeting features or user features. As discussed herein, certain section representations include at least one of (1) an image generated based on visual content occurring during the corresponding section or (2) a text summary corresponding to the corresponding section and generated based on the meeting feature. For example and as illustrated in FIG. 3, a section representation 310A, corresponding to content presented by the CEO, includes an image 312A of the CEO and a text summary 314A providing a general overview of the subject matter discussed during the section. In one example, the meeting section determiner 270 determines the image of the section representation based on a screenshot of the content presented, and/or the meeting section determiner 270 determines the image of the section representation based the content of the section, the text summary, the user features associated with the section, or the meeting features associated with the section.

In one embodiment, the meeting section determiner 270 determines the section by accessing user data and/or meeting data; determining a user feature based on the user data and/or a meeting feature based on the meeting data; classifying the first section into a personal classification specific to a user based on the meeting feature and/or the user feature; and generating an image and a text summary associated with the personal classification. For example, the user profile 240 of the user may indicate that the user has preferences for viewing crypto-specific financial information, such that the user features are determined to include consideration of financial information. Continuing this example, the section is classified as a section having crypto-specific financial information instead of merely financial information, thereby providing a personal classification of the section, a personal image, and a personal text summary for the section representation associated with the section. In this manner, certain embodiments of the PNMR UI generator 292 generate the PNMR UI with a first graphical user interface (GUI) element indicative of the image and a second GUI element indicative of the text summary. In FIG. 3, for a particular section representation 310, the first GUI element is the image 312 and the second GUI element is the text summary 314.

In one embodiment, the meeting section determiner 270 determines the section representation 310 (FIG. 3) based on a level of engagement of a user. In one embodiment, the meeting section determiner 270 determines whether the user is a presenter (or presented), whether the user attended and actively participate (for example, by talking, engaging with the chat, and so forth) in the meeting, whether the user attended and did not actively participate in the meeting, or whether the user did not attend the meeting. For example, the level of detail of the text summary may relate to the level of engagement of a user. In one example, the text summary 314 is more detailed (and has more alphanumeric characters) when the user attended and actively participated in the meeting than when a user did not attend the meeting. In one example, the text summary 314 may include an information relating to the user's engagement. It should be understood that, in some embodiments, the image 312 (FIG. 3) may also be generated based on the level of engagement of the user.

Continuing with FIG. 2, the meeting structure determiner 290, in general, determines a meeting structure for organizing sections determined by the meeting section determiner 270. In one example, the meeting structure is a logical organization by which the sections are organized. Example logical organizations include a hierarchical logical organization, a chronological logical organization, a speaker-indexed logical organization, a topic-indexed logical organization, a relevance ranked logical organization, or any other suitable logical organization relevant to the user. In one example, the section representations are organized (for example, relative to each other) based on the corresponding meeting structure.

In certain embodiments, the meeting structure determiner 290 employs structure determination logic 235 to perform any of the steps described herein, such as determining the meeting structure for organizing sections determined by the meeting section determiner 270. In one embodiment, structure determination logic 235 comprises computer instructions including rules, conditions, associations, predictive models, classification models, or other criteria for, among other operations, determining an adaptive playback speed for a time-stretched section and/or scoring or ranking the sections of the meeting recording (determined by the meeting section determiner 270) for an adaptive playback speed. In one embodiment, structure determination logic 235 takes different forms, depending on the particular sections being determined, contextualized, or processed to determine the corresponding adaptive playback speed, and/or based on user-meeting data or data indicating a context. For example, structure determination logic 235 comprises any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these to determine (or facilitate determining) the meeting feature according to embodiments described herein.

In one example, the meeting structure determiner 290 determines the meeting structure based on meeting features and/or user features. For example, the meeting structure determiner 290 adds a new meeting section representation based on identifying a new speaker, a new media, a new topic, or other changes in meeting features and/or user features. To help illustrate, suppose the meeting recording includes four speakers, and the fourth speaker is later identified by the meeting structure determiner 290, for example, based on a change in meeting features (such as based on a change in sound parameters or visual parameters of the meeting recording). In this example, the fourth speaker discusses a subtopic (for example, yearly expenses) associated with a topic (for example, finances) discussed by the third speaker. In this example, the meeting structure determiner 290 determines that the section representations are related such that the meeting structure is determined to be a hierarchical logical organization with the section representation corresponding to the fourth speaker's content being a subsection of the section representation corresponding to the third speaker.

In one embodiment, the meeting structure determiner 290 determines whether sections are related based on a degree of similarity between user features and/or meeting features of each of a first section and a second section determined by the meeting section determiner 270. In one embodiment, the degree of similarity is expressed as a percentage, ratio, threshold value, or any combination thereof. In one example, "substantially equals" refers to the meeting features or users features differing less than a threshold amount, expressed as a percentage, ratio, threshold number, and so forth, such as the meeting features and/or users features differing less than 5, 10, 15, 20%, and so forth.

In one embodiment, the degree of similarity is expressed as a threshold percentage of total meeting features and/or user features, such that a higher percentage (for example, higher than a first threshold) of similarity between the first section and the second section results in the meeting structure determiner 290 classifying the two sections as one common section. The higher percentage may be any suitable percentage, such as 30%, 40%, 50%, 60%, 70%, 80%, 90%, or any percentage value in between, lower, or higher. As a result, the meeting structure determiner 290 can join the first and second section into one section representation, thereby refining the results of the meeting section determiner 270. In this example, the first and second section correspond to one section representation based on the first and second sections sharing the higher percentage of similarity.

In another example, suppose the percentage of similarity is lower than the higher percentage of similarity (for example, lower than the first threshold, but higher than a second threshold). In response to determining that the percentage of similarity is below the first threshold but higher than a second threshold, certain embodiments of the meeting structure determiner 290 classify the first section and the second section as two related sections. In one embodiment, based on the degree of similarity being between the first and second thresholds, the meeting structure determiner 290 may classify one section as a parent section representation and the other section as the child section representation in a meeting structure organized in accordance with a hierarchical logical organization.

In another example, suppose the percentage of similarity is lower than the second threshold. In this example, based on the percentage of similarity being lower than the second threshold, the meeting structure determiner 290 determines separate section representations for each of the first section and the second section, for example, such that the first section representation and the second section representation are not subsections of each other.

Although these examples are discussed in the context of two meeting sections, these embodiments are applicable to any number of meeting sections. Additionally, although this example is discussed in the context of the meeting structure determiner 290 determining that the meeting structure is a hierarchical logical organization, in some embodiments, the meeting structure determiner 290 determines the meeting structure to, additionally or alternatively, include a chronological logical organization, a speaker-indexed logical organization, a topic-indexed logical organization, a relevance ranked logical organization, or any other suitable logical organization relevant to the user.

By way of another example, the meeting structure determiner 290 determines an order of the section representations determined by the meeting section determiner 270 based on a relevance of the section to the user. For example, based on a first meeting feature and a first user feature associated with a first section of the meeting recording, the meeting structure determiner 290 determines a first relevance weight to a user profile. Continuing this example, the meeting structure determiner 290 determines, based on a second meeting feature and a second user feature associated with a second section of the meeting recording, a second relevance weight to a user profile. Additionally or alternatively, the meeting structure determiner 290 generates, based on the first relevance weight being greater than the second relevance weight, the meeting structure with a first section representation corresponding to the first section ranked higher than a second section representation corresponding to the second section. In this manner, the meeting structure determiner 290 generates the meeting structure with the first section representation listed above or before the second section representation in the meeting structure based on the first section being ranked higher than the second section. Alternatively, certain embodiments of the meeting structure determiner 290 generate the meeting structure with the first section being automatically played back before the second section, the first section representation being a grouping in a hierarchy and the second section representation being a subgroup of the grouping of the first section representation in the hierarchy, or the first section representation being displayed as more or less relevant that the second section representation.

In some embodiments, the meeting structure determiner 290 employs structure determination logic 235 to determine a weight or a category for a particular section. In one example, weights or a respective category of the sections are used to determine the meeting structure or the section representation for a corresponding section. For instance, according to some embodiments, a weight or category corresponds to an order of the section representations in the meeting representation, such that determining the weight or category of the section results in the order of the section representations displayed on the PNMR UI generated by the PNMR UI generator 292 being determined. In one embodiment, a weight is determined and used for inferring relevance of a section to the user. For example, a high weight indicates higher relevance; a low weight indicates lower relevance; or conversely, a high weight indicates lower relevancy; or a low weight indicates higher relevancy. Similarly, a section may be classified as a particular category or section, which may indicate relevance to the user. In some embodiments, a weight or a category of a section is determined based on a classification of a meeting feature and/or user feature associated in the section, which may be determined as described previously using meeting feature determination logic 230.

In some embodiments, meeting structure determiner 290 or structure determination logic 235 use user-meeting data associated with a particular user to determine the relevance of the section to the user, which is represented as the weight or a category associated with the section. Thereafter, in one embodiment, the section representation and/or the meeting structure is determined based on the weight or category. For example, each category may correspond to a weight corresponding to a level of relevance to a user based on user settings specified in user configurations/settings 246. In one implementation, where the order of the section representations are automatically determined, two or more categories comprise indications of relevance to a user, such as relevant and less-relevant. A lower position within the PNMR UI or a shorter summary of the section representation is automatically determined for the less-relevant category, and a higher position within the PNMR UI or a more detailed summary of the section representation is automatically determined for the relevant category.

A weight or category for the section is determined, for example and without limitation: based on meeting features (determined by meeting feature determiner 260); based on user features (determined by user feature determiner 256); based on user history, such as whether the user has previously been presented (or engaged) with a similar section; and/or based on settings or preferences, which can be configured by the user or an administrator, such as user configurations/settings 246 in a user profile 240.

In one example, the weight or category relates to the order of the corresponding section representation or a level of detail for the section representation (for example, the level of detail of the text summary or the image) via any suitable data structure stored in storage 225, such as a linear data structure that includes a list or an array; a tree data structure that includes binary, heap, and/or space partitioning; a table; or a hash data structure that includes a distributed hash table, a hash tree; or any suitable linear or non-linear data structure. For example, the meeting structure determiner 290 maps the determined weight or category to the order of the corresponding section representation or a level of detail for the section representation. In one embodiment, the section representations are ordered or grouped in the meeting structure based on the weight or category.

In some embodiments, the meeting structure determiner 290 uses the corresponding weight of the section to rank, prioritize, or filter sections, such that only certain section representations (having high or low weights) are presented on the PNMR UI by the PNMR UI generator 292. Some embodiments of the meeting structure determiner 290 are configured to filter section representations so only certain section representations, such as those corresponding to sections having a certain weight, or those that have not recently been watched, or those having certain meeting features are presented on the PNMR UI. For example, section representations corresponding to sections that do not have high or low weights, such as those that do not have the top 10% of the highest weight value or the lowest 10% of the lowest weight value, are not displayed on the PNMR UI, but may be accessed by scrolling down or expanding the listing of the section representations. Although the previous example included only presenting those section representations corresponding to sections having the highest or lowest percentage of weight values, it should be understood that any portion of the total sections may be filtered out, such as only a threshold number of sections, the highest (or lowest) weighted section, or a section having a pre-set meeting feature are presented on the PNMR UI via the PNMR UI generator 292. Indeed, any suitable portion (or subset) of all the sections may be filtered out and not presented on the PNMR UI to avoid computationally determining section representations for all sections determined by the meeting section determiner 270.

In some embodiments, the meeting structure determiner 290 or the meeting section determiner 270 classifies the section determined by meeting section determiner 270 based on the context of the user. For instance, as described previously, the user-meeting data associated with the user, which indicates the user's context, can include information indicating a particular computing application or device being used by the user to access a meeting or meeting recording. Thus, in one example, the information about the particular computing application is used by meeting section determiner 270 or the meeting structure determiner 290 to determine a classification for the section. Alternatively, the meeting section determiner 270 or the meeting structure determiner 290 may classify the section based on the meeting features or user features associated with the section. As another example, if the section includes a particular topic (determined by the topic/keyword determiner 266), the section is classified based on the topic and the topic's relationship to the user, a group of users, or the organization.

Although in one embodiment, the meeting structure determiner 290 determines an order of meeting segments, it should be understood that in some embodiments the meeting structure determiner 290 recommends meeting recordings for a user's future consumption. In one embodiment, the meeting structure determiner 290 determines suitable meeting recommendations based on a user data and/or meeting data. In this manner, the meeting structure determiner 290 can recommend future meetings for the user's consumption. The recommended future meeting may be stored in a cache so that the meeting structure and the section representation is determined for the recommended meeting recording. For example, the recommended meeting recordings are batched and processed during times of lower computational activity (for example, below threshold values or below daily, weekly, monthly, and so forth, averages) to improve the speed by which the meeting structure and meeting sections are provided for recommended meeting recordings.

Example system 200 of FIG. 2 also includes storage 225. Storage 225 generally stores information including data, computer instructions (for example, software program instructions, routines, or services), logic, profiles, and/or models used in embodiments described herein. In an embodiment, storage 225 comprises a data store (or computer data memory). Further, although depicted as a single data store component, storage 225 can be embodied as one or more data stores or in the cloud.

As shown in example system 200 of FIG. 2, storage 225 includes meeting feature determination logic 230 and structure determination logic 235, as previously described. Storage 225 also includes an example embodiment of a user profile 240 and extracted feature data 280. Example user profile 240 includes information about user accounts and devices 242, user-meeting data 244, and user configurations/settings 246. In some embodiments, the information stored in user profile 240 is available to other components of example system 200.

User accounts and devices 242 generally includes information about user devices accessed, used, or otherwise associated with a user, and/or information related to user accounts associated with the user, for example, which are used for accessing or collecting user data for a user (such as a user interacting with a meeting recording). For example, information of user accounts and devices 242 comprises at least one of: online or cloud-based accounts (for example, email, social media) such as a Microsoft® MSA account or a Microsoft 365 account; other accounts, such as entertainment or gaming-related accounts (for example, Xbox®, Netflix®, online game subscription accounts, or similar account information); communication data that relates to such accounts, such as user emails, texts, instant messages, calls, other communications, and other content; social network accounts and data, such as news feeds; online activity; and calendars, appointments, application data, other user accounts, or the like. Some embodiments of user accounts and devices 242 store information across one or more databases, knowledge graphs, or data structures. As described previously, certain information stored in user accounts and devices 242 is determined from meeting-data collection component 210 or user activity monitor 250 (including one or more of its subcomponents).

As described previously, user-meeting data 244 generally includes information about a user associated with the user profile 240. In one embodiment, user-meeting data 244 includes user data received from meeting-data collection component 210 or user data determined by user activity monitor 250 (or its subcomponents), which includes user-related activity data, a context or contextual information, and user data features (or structured or semi-structured user data). In one embodiment, user-meeting data 244 includes information regarding a transcript of spoken content delivered during the meeting, or a chat transcript of messages exchanged privately or publicly during the meeting. In certain embodiments, user-meeting data 244 includes information regarding the user's interactions with one or more meetings or meeting recordings, such as the number of interactions, frequency, or other data regarding the interactions the user had during the meeting or past meeting recordings that are relevant to the user.

User configurations/settings 246 generally includes user settings or preferences associated with embodiments described herein. By way of example and not limitation, such settings include user configurations or preferences about the various thresholds described herein, confidence values associated with inferences, explicitly defined settings regarding user data used to determine a section representation and/or meeting structure, preferences regarding a section representation and/or meeting structure, preferences or configurations regarding the presentation of the PNMR UI by computing applications and services used by the user, or other preferences or configuration settings for any of the embodiments described herein.

Example extracted feature data 280, in general, comprises data associated with the meeting feature determined by the meeting feature determiner 260, data associated with the user feature determined by the user feature determiner 256, and any suitable data helpful in generating the interfaces of FIGS. 3, 4, and 5. In one embodiment, the presentation component 220 receives the extracted feature data 280 to generate the interfaces of FIGS. 3, 4, and/or 5. For example, the extracted feature data 280 includes data associated with the sections and section representations determined by the meeting section determiner 270, the meeting structure(s) determined by the meeting structure determiner 290, and so forth.

Example system 200 includes a presentation component 220 that is generally responsible for presenting content including aspects of the section representations, the meeting structure, and the extracted feature data 280. In one example, the content is presented via one or more presentation components 916, as described in FIG. 9. In one embodiment, presentation component 220 comprises one or more applications or services on a user device across multiple user devices or in the cloud. For example, presentation component 220 manages the presentation of the section representations based on the meeting structure across multiple user devices associated with that user, which the user accesses via a mobile device, laptop, or VR headset, and so forth. For example, presentation component 220 determines which user device(s) content is presented on and/or how much content is presented, presents the PNMR UI generated by the PNMR UI generator 292, including the section representations generated by the meeting section determiner 270 based on the meeting structure determined/generated by the meeting structure determiner 290; presents the extracted feature data 280; and/or presents any data associated with any other components of system 200. Presentation component 220 presents extracted feature data 280, including any substitutions, reorganizations, or highlights as directed by presentation logic, meeting feature determiner 260, meeting section determiner 270, meeting structure determiner 290, PNMR UI generator 292, and extracted feature data 280. In some embodiments, presentation component 220 or the PNMR UI generator 292 presents the section representations based on the meeting structure, proactively and dynamically, such that when a user interacts with (for example, selects) a GUI element of the section representation, the presentation component 220 causes a player region of the GUI to present the portion of the meeting based on the user interaction. For example, presentation component 220 determines when, whether, and how to present the meeting recording based on a context, and/or based on meeting feature determiner 260, meeting section determiner 270, meeting structure determiner 290, and/or extracted feature data 280.

Some embodiments of PNMR UI 292 assemble or format the section representations on the section representation region for consumption by a computing application or service. For example, as described previously, meeting section determiner 270 determines a set of sections for a particular computing application (for example, mobile application, VR application, or desktop application). Furthermore, some embodiments of the meeting structure determiner 290 specify the order, format, or arrangement of the section representations formatting of, and/or to facilitate the formatting or presentation of the meeting recording to a user via a computing application or service. For example, the presentation component 220 presents one or more relevant section representations, including a text summary and/or an image, to a user via a meeting application, and additionally presents the meeting recording which has been updated based on a selection of a GUI element of the section representations. Similarly, in one example, presentation component 220 specifies presentation content to present in a player region based on user selection of a section within a section representation region. For example, in response to receiving a selection within the section representation region, the presentation component 220 causes the player region to change the meeting recording to the time during the meeting recording corresponding to the selected section representation. In this manner, a user is able to quickly toggle to a portion of the meeting recording by causing the presentation component 220 to present the corresponding portion of the meeting recording to more quickly deliver desirable information to the user, enhancing the user experience and reducing resources associated with a user having to watch the entire meeting recording.

In one embodiment, the PNMR UI generator 292 generates user interface elements associated with or used to facilitate the section representation region and player region (such as shown in connection with FIGS. 3 and 4). Such elements can include icons or indicators, graphics buttons, sliders, menus, audio prompts, alerts, alarms, vibrations, pop-up windows, notification-bar or status-bar items, in-app notifications, queries, prompts, or other similar features for interfacing with a user. It should be understood that, in certain embodiments, the PNMR UI generator 292 may be omitted and corresponding functionality may be instead performed by any component of system 200.

With reference now to FIGS. 3, 4, and 5, a number of example schematic screenshots from a personal computing device are illustratively depicted, showing aspects of example PNMR UIs that include presentation of section representations presented based on a meeting structure and selectable to cause presentation of the corresponding section of the meeting recording, as described herein. The example section representations shown in FIGS. 3, 4, and 5 are determined for a particular user and contextualized for that user, such as described in connection with the components of system 200 of FIG. 2. In particular, FIGS. 3 and 4 correspond to PNMR UIs generated for a first user (in that example, the CTO of an enterprise) accessing or viewing a meeting recording, and FIG. 5 corresponds to the PNMR UI generated for a second user (in that example, a student intern of the enterprise) accessing or viewing the same meeting recording. As such, in certain embodiments, the PNMR UI may be user-specific, such that the PNMR UI includes different section representations, a different meeting structure, or any other differences, even if the same meeting recording is accessed.

Certain example sections are determined and generated by the meeting section determiner 270 of FIG. 2 based on meeting features determined by meeting feature determiner 260 and/or user features determined by user feature determiner 256; the meeting structure is determined and applied by the meeting structure 290 of FIG. 2; and the PNMR UI, including the section representation region and the player region, is generated by the presentation component 220 and/or the PNMR UI generator 292 of FIG. 2. Moreover, although specific section representations are generated in accordance with a meeting structure (for example, based on relevance) in FIGS. 3, 4, and 5, it should be understood that any alternative or additional section representations can be generated based on any of the meeting features discussed herein. Additionally, although the embodiments illustrated in FIGS. 3, 4, and 5 include an example desktop interface, it should be understood that the PNMR UI may be generated for any target environment on any suitable device, including, but no limited to, a laptop, a mobile device, a VR headset, and the like. For example, the meeting structure, the section representation, and the like may be determined based on the type of device (for example, desktop or mobile device) or properties of the device, such as display screen size, such that a PNMR UI generated on a laptop may include more information than a PNMR UI generated on a mobile device. Similarly, only the most relevant (for example, the highest ranked) section representations may be shown on a mobile device.

Turning to FIG. 3, an example schematic screen display 300 is shown, which represents a computing device, such as user device 102*n*, discussed above with respect to FIG. 1. Screen display 300 is shown having a PNMR UI 302, which could be produced on the computing device screen display 300 by any of a number of different computer programs, applications or other displays discussed herein. In some embodiments, the PNMR UI 302 includes a player region 304 and a section representation region 306. In one example, the player region 304 displays the recording of the meeting recording. For example, the player region 304 is capable of playing back a video stream or recording that has been formatted as MPEG-4 Part 14 (MP4) file, a MOV file, a QuickTime File Format (QTFF) file, a WMV file, an AVI file, an Advanced Video Coding High Definition (AVCHD) file, a WebM file, MKV file, or any other suitable video formatted file.

To facilitate navigating to various portions of the meeting recording and to facilitate tracking progression through the video, in certain embodiments, the player region 304 includes a timeline that includes a play indicator 308 that is selectable to pause and continue playing the meeting recording presented on the player region 304. In one example, the timeline is positioned at the bottom of the player region 304, below the player region 304, or at any suitable position on the PNMR UI 302. In some embodiments, the timeline may have a length that corresponds to a duration of the meeting recording. For example, the leftmost side of the timeline corresponds to a start of the meeting and the rightmost side corresponds to an end of the meeting recording. A user may navigate to any portion of the meeting recording by selecting a point between the leftmost end and the rightmost end of the timeline.

To better help a user navigate to a particular portion of the meeting recording that is of interest, the example PNMR UI 302 includes a plurality of section representations 310 in the section representation region 306. In the illustrated embodiment, the section representation region 306 of the PNMR UI 302 includes a first section representation 310A having a first image 312A, a first text summary 314A, and a time range indicator 316A; a second section representation 310B having a second image 312B, a second text summary 314B, and a time range indicator 316B; a third section representation 310C having a third image 312C, a third text summary 314C, and a time range indicator 316C; a fourth section representation 310D having a fourth image 312D, a fourth text summary 314D, and a time range indicator 316D; and a fifth section representation 310E having a fifth image 312E, a fifth text summary 314E, and a time range indicator 316E. As discussed herein, in one example, the image 312 includes a representative visual GUI element, such as a picture or screenshot related to the corresponding section representation 310 and defined between the time ranges of the time range indicator 316. As discussed herein, in one example, the text summary 314 includes alphanumeric characters providing a summary in any specific language related to the section of the meeting recording the corresponding section representation 310 and defined between the time ranges of the time range indicator 316.

In the illustrated embodiment, the PNMR UI 302 is viewed by a first user, for example, a CTO of the enterprise. Based on user features (specific to the CTO) and meeting features (specific to the meeting recording), a computing system (employing embodiments of the system 200 of FIG. 2, such as the computing system 900 of FIG. 9) determines the illustrated section representations 310. In this example, the first section representation 310A is displayed toward the top of the section representation region 306 because the section corresponding to the first section representation 310A is determined as the most relevant section representation 310. In this example, the first section representation 310A is the most relevant section to the viewer because the corresponding section includes the CEO keynote speaker update occurring between timestamps 8:32 and 13:17, as illustrated by the time range indicator. As illustrated in FIG. 3, the first section representation 310A corresponds to the section of the meeting recording during which the CEO presented content, and the first section representation 310 includes an image 312A of the CEO and a text summary 314A providing a general overview of the subject matter discussed by the CEO during the section.

In one embodiment, in response to user selection of any of the section representations 310, playback of the meeting recording presented on the player region 304 toggles to the section of the meeting recording corresponding to the selected section representation 310. For example, suppose the user selects the first section representation 310A or any associated GUI element, such as the first image 312A, the first text summary 314A, or the time range indicator 316A. In response to selection of the first section representation 310A or any associated GUI element, a computing device transitions presentation of the meeting recording to the first section (in this example, starting at 8:32). In some embodiments, the user can select a particular portion of the section representation 310 to refine playback of the meeting recording in the player region 304 to a more specific portion of the meeting recording. For example, a user selection of a particular sentence, word, clause, or any other portion of the text summary causes the computing device to toggle playback to the portion of the meeting recording that is directed to the general subject matter of the selected sentence, word, clause, or any other portion of the text summary.

As illustrated, in one embodiment, the PNMR UI 302 includes selectable GUI elements corresponding to recommended meeting recordings 330. In one embodiment, the meeting structure determiner 290 determines recommended meeting recordings 330 based on a user data and/or meeting data. In this manner, the meeting structure determiner 290 can recommend meeting recordings 330 for the user's future consumption. The recommended meeting recordings 330 may be stored in a cache so that the meeting structure and meeting section representation is determined for the recommended future meeting. For example, the recommended meeting recordings 330 are batched and processed during times of low computational activity to improve the speed by which the meeting structure and section representations are provided for the recommended meeting recordings 330. In the illustrated embodiment, the recommended meeting recordings 330 are presented on the PNMR UI 302 and selectable to cause playback of the selected recommended meeting recording 330. Thereafter, in one example, the selected recommended meeting recording is played back on the PNMR UI 302, which includes one or more section representation generated based on a meeting structure.

Although in the illustrated embodiment five section representations 310 are generated (for example, by the meeting section determiner 270) and organized in accordance to a meeting structure that includes a relevance ranked logical organization, any number of section representation can be generated and organized based on any suitable meeting structure. For example, FIG. 4 includes an expanded view of the first section representation 310A, including three subsection representations 410, associated with the first section representation 310A.

Turning to FIG. 4, depicted is a PNMR UI 402 that includes an example schematic screen display 400, which represents a computing device, such as user device 102n, discussed above with respect to FIG. 1. As compared to the PNMR UI 302 of FIG. 3, the PNMR UI 402 of FIG. 4 includes a section representation region 306 that includes the first section representation 310A that has been expanded to show subsection representations 410 associated with the first section representation. In particular, the illustrated first section representation 310A includes three subsection representations 410A, 410B, 410C, each including a corresponding image and text summary, but in certain embodiments, the image or text summary may be omitted in the subsection representation 410. In one embodiment, the first section representation 310A is expanded to present the three subsection representations 410A, 410B, 410C based on any suitable user input, such as a hovering input, a right click, a left click, or any other suitable selection. In one embodiment, the subsection representations 410 may be arranged based on the same or different meeting structures as the section representations 310. For example, the meeting structure of the section representations 310 may include a relevance ranked logical organization, while the meeting structure of the subsection representations 410 includes a topic-indexed logical organization, a hierarchical logical organization, a chronological logical organization, a speaker-indexed logical organization, or so forth.

In one embodiment, in response to a user selection of any of the subsection representations 410, playback of the meeting recording presented on the player region 304 toggles to the section of the meeting recording corresponding to the selected section representation 310. For example, suppose the user selects the second subsection representation 410B or any associated GUI element, such as the corresponding time range indicator. In response to selection of the second subsection representation 410B or any associated GUI element, a computing device transitions presentation of the meeting recording to the second subsection (in this example, starting at 12:02). In some embodiments, the user can select a particular portion of the subsection representation 410 to refine playback of the meeting recording in the player region 304 to a more specific portion of the meeting recording. For example, a user selection of a particular sentence, word, or clause in the text summary of the subsection representation 410 causes the computing device to toggle playback to the portion of the meeting recording that is directed to the general subject matter of the selected sentence, word, or clause in the text summary.

Turning to FIG. 5, depicted is an example schematic screen display 500 presented by a computing device, such as user device 102n, discussed above with respect to FIG. 1. Screen display 500 is shown having a PNMR UI 502, which could be produced on the computing device screen display 500 by any of a number of different computer programs, applications or other displays discussed herein. In some embodiments, the PNMR UI 502 includes a player region 304 and a section representation region 306. Whereas the PNMR UI 302 and 402 of FIGS. 3 and 4 are specific to the first user (in those examples, the CTO), the PNMR UI 502 illustrated FIG. 5 is specific to a second user (in this example, a lower level employee, such as a temporary student intern). Although the PNMR UIs 302, 402, and 502 illustrated in FIGS. 3, 4, and 5 include a player region 304 configured to play the same meeting recording, the illustrated section representations 310 in the section representation region 306 of PNMR UI 502 include different section representations 310. That is, in some embodiments, although the same meeting recording is accessible by different users, the section representations and meeting structure are personalized to the user. For example, the sections determined for the second user, the section representations (including the corresponding image and text summary), and the meeting structure are different for the second user (in this example, the temporary student intern) as compared to the first user (in that example, the CTO).

In some embodiments, a user is able to manually add, modify, or delete section representations, in addition or alternatively, to those automatically presented on the section representation region 306. For example, while watching the meeting recording, the user notices a section of interest being played in the player region 304. To manually create a section representation for the section of interest corresponding to the topic being discussed, the user may input a selection or any other input, such as a string of alphanumeric characters, a selection from a drop-down menu, a selection of a checkbox, and so forth. In this manner, a user can manually add section representations so that the system (for example, system 200 of FIG. 2) may automatically receive user preferences on the section representations to improve future automatic generation of the section representations.

Figure 6:
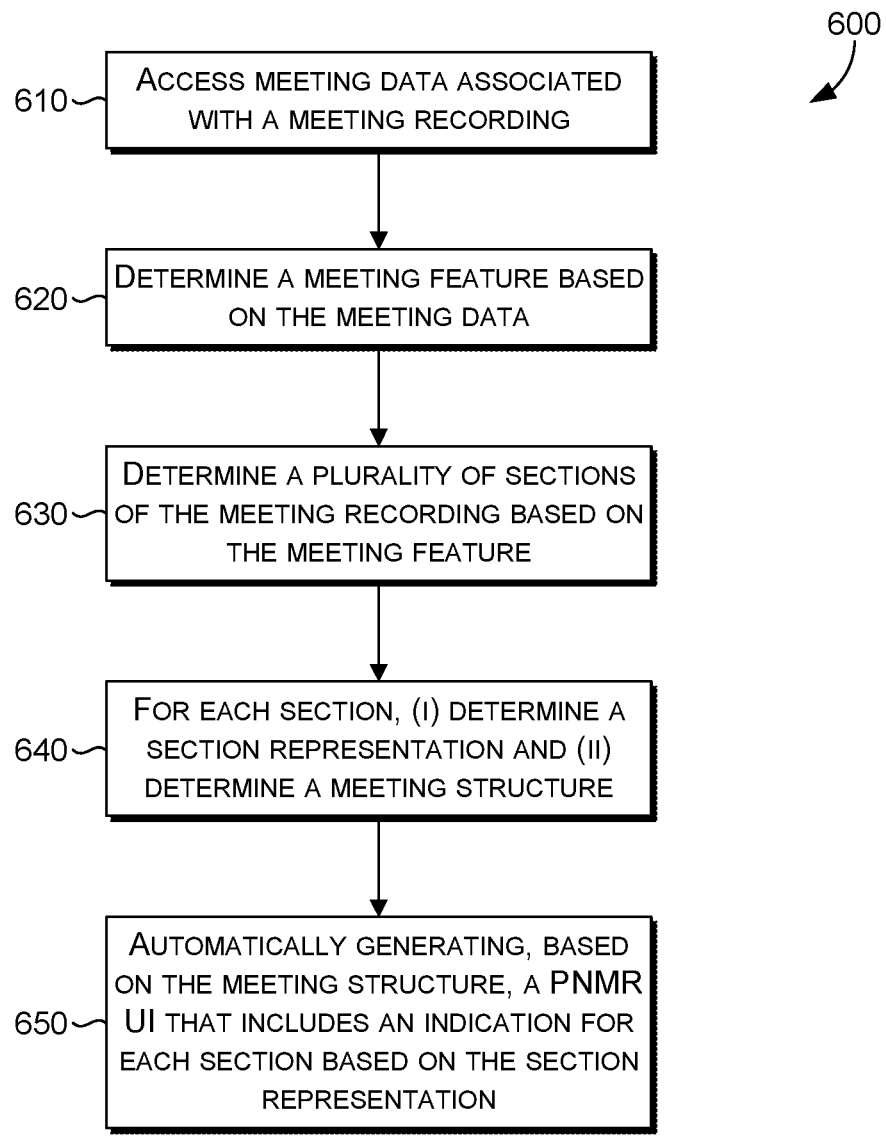
FIG. 6 depicts a flow diagram of a method for programmatically determining a section representation and generating a GUI that includes the section representation generated based on a meeting structure, in accordance with an embodiment of the present disclosure.
Figure 7:
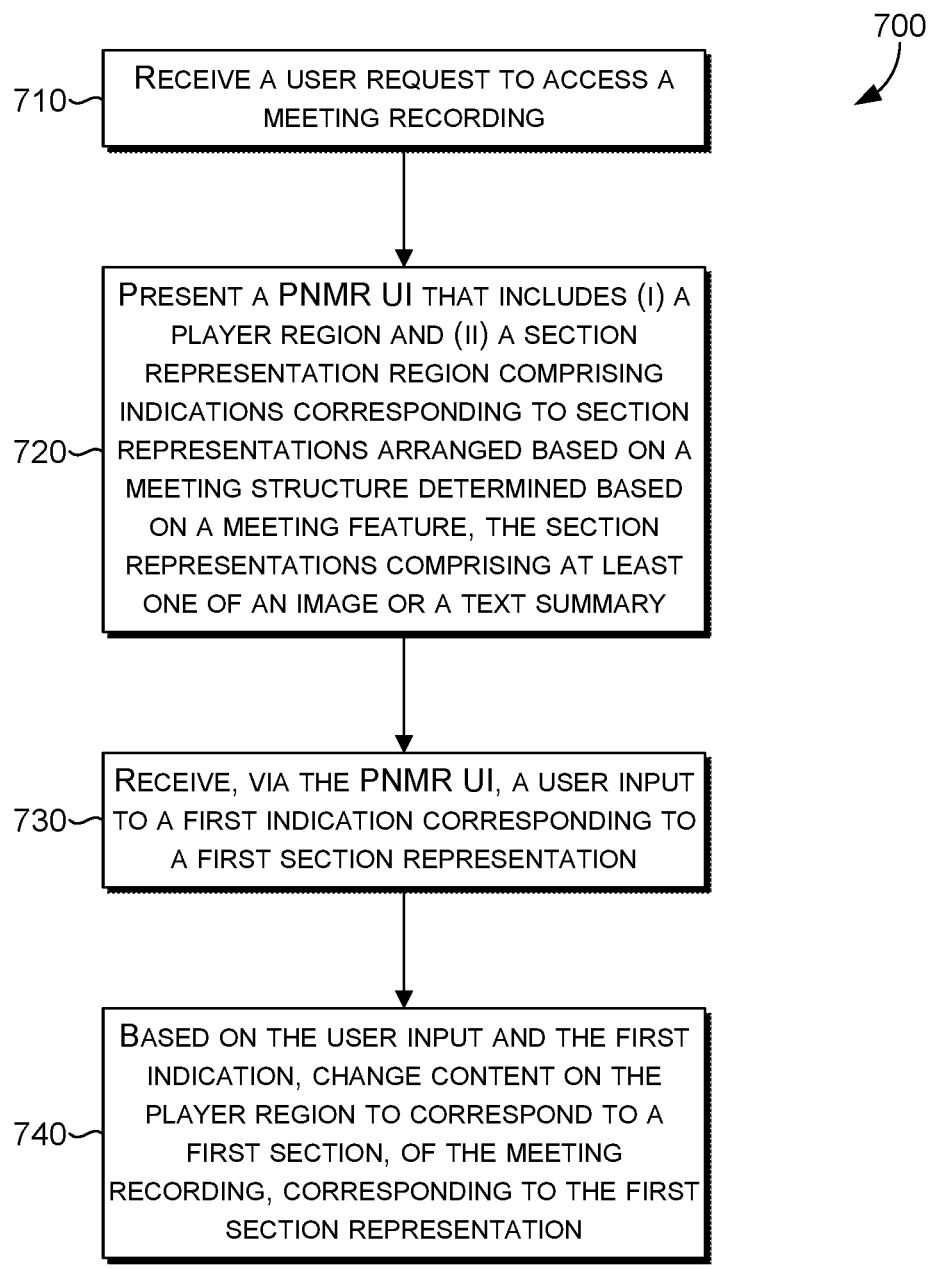
FIG. 7 depicts a flow diagram of a method for programmatically generating a GUI that includes the section representation generated based on a meeting structure and controlling playback of a meeting recording, in accordance with an embodiment of the present disclosure.
Figure 8:
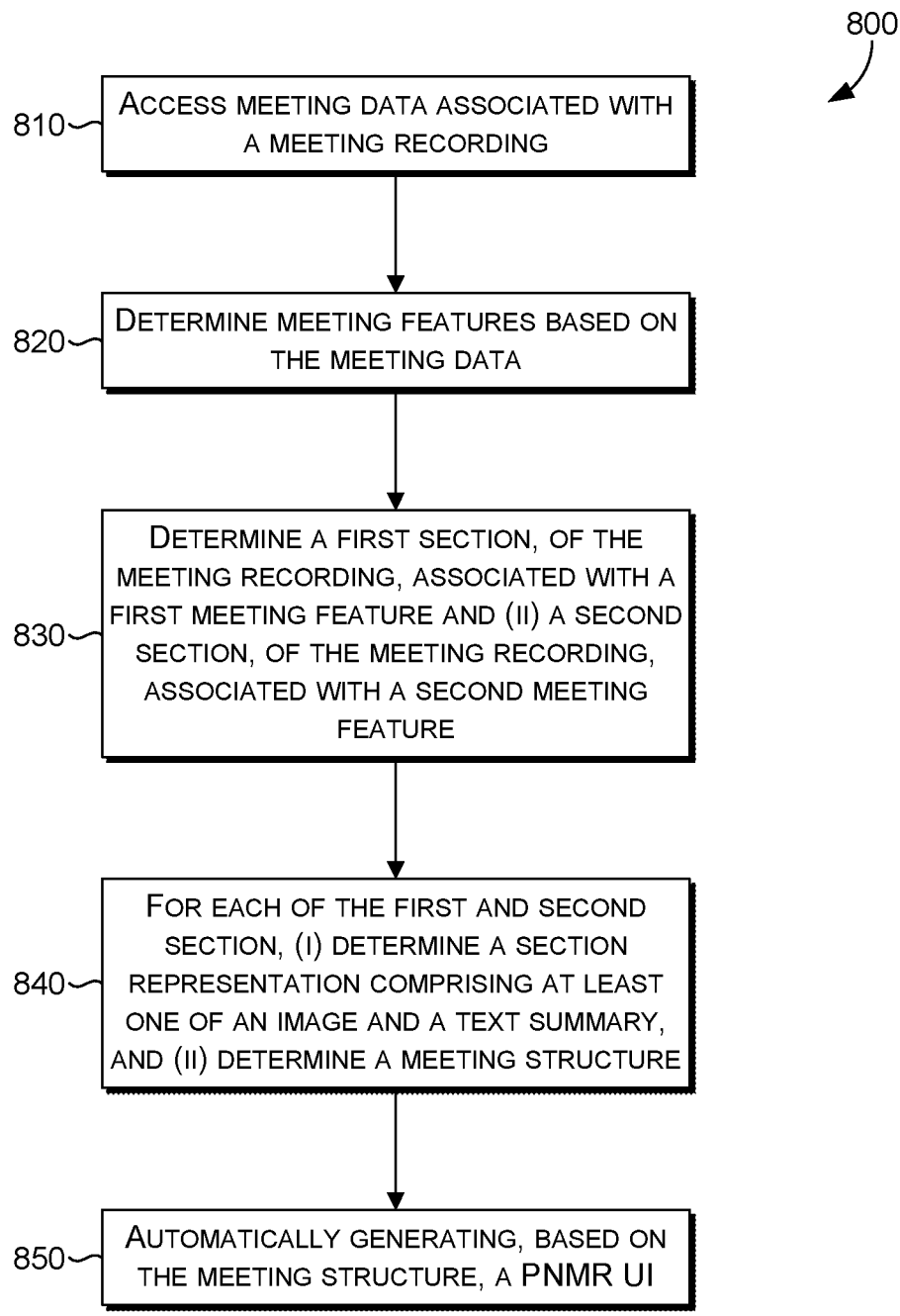
FIG. 8 depicts a flow diagram of a method for programmatically determining a section representation and generating a GUI that includes the section representation generated based on a meeting structure, in accordance with an embodiment of the present disclosure.

Turning now to FIGS. 6, 7, and 8, aspects of example process flows 600, 700, and 800 are illustratively depicted for some embodiments of the disclosure. Process flows 600, 700, and 800 each comprise a method (sometimes referred to herein as method 600, 700, and 800) that may be carried out to implement various example embodiments described herein. For instance, at least one of process flows 600, 700, or 800 are performed to programmatically determine events of interest or generate section representation(s), meeting structures, and/or PNMR UIs for a user by processing meeting data, which are used to provide any of the improved electronic communications technology or enhanced user computing experiences described herein.

Each block or step of process flow 600, process flow 700, process flow 800, and other methods described herein comprises a computing process that may be performed using any combination of hardware, firmware, and/or software. For instance, various functions are carried out by a processor executing instructions stored in memory, such as memory 912 described in FIG. 9 and/or storage 225 described in FIG. 2. The methods may also be embodied as computer-usable instructions stored on computer storage media. The methods may be provided by a stand-alone application, a service or a hosted service (stand-alone or in combination with another hosted service), or a plug-in to another product, to name a few. For example, the blocks of process flows 600, 700, and 800 that correspond to actions (or steps) to be performed (as opposed to information to be processed or acted on) are carried out by one or more computer applications or services, in some embodiments, which operate on one or more user devices (such as user device 102a of FIG. 1), servers (such as server 106 of FIG. 1), and/or are distributed across multiple user devices, and/or servers, or by a distributed computing platform, and/or are implemented in the cloud, such as described in connection with FIG. 10. In some embodiments, the functions performed by the blocks or steps of process flows 600, 700, and 800 are carried out by components of system 200, as described in connection to FIG. 2.

With reference to FIG. 6, aspects of example process flow 600 are illustratively provided for determining the section representation 310 of FIG. 3 and generating a PNMR UI that includes the section representation generated based on the meeting structure. In one example, example process flow 600 is performed to generate the section representation illustrated in FIG. 3 and as described in connection with FIG. 2.

At a block 610, method 600 includes accessing meeting data associated with a meeting recording. Embodiments of block 610 perform operations including receiving meeting data, as discussed in FIG. 2, with respect to the meeting-data collection component 210 and the user activity monitor 250. In particular, meeting data may include any data associated with the user and a meeting attended by the user, an example of which includes meeting information, transcript information, contact information, and other user or meeting-related data discussed herein.

At block 620, method 600 includes determining a meeting feature based on the meeting and/or associated meeting data. Example meeting features include a topic of the meeting recording, a type of meeting recording, an identity of a speaker in the meeting recording, a relationship of the speaker to a viewer, a duration of the meeting recording, a duration of pauses in the meeting recording, a transition from a first speaker to a second speaker different from the first speaker, a meeting type, a media type, or contextual metadata expressed as data features indicative of meeting invitees, meeting attendees, or a type of meeting. In some embodiments, the meeting feature determiner 260 of FIG. 2 determines (block 620) the meeting features as discussed with respect to FIG. 2.

At block 630, method 600 includes determining a plurality of sections of the meeting recording based on the meeting feature, such as the meeting feature determined by embodiments of block 620. In one embodiment, the meeting section determiner 270 of FIG. 2 determines (block 620) the sections, as discussed herein.

At block 640, method 600 includes, for each section, determining a section representation and a meeting structure for displaying the section representations. In one embodiment, the meeting section determiner 270 or the meeting structure determiner 290 determines the section representations and/or the meeting structure. As discussed herein, the section representation, such as the section representation 310 of FIG. 3, includes an image 312 (FIG. 3) and/or a text summary 314 (FIG. 3). In one example, the image is generated based on visual content occurring during the corresponding section, and the summary is generated based on a meeting feature and/or a user feature.

At block 650, method 600 includes automatically generating a PNMR UI based on the meeting structure, the PNMR UI comprising an indication of each section based on the section representation. Example PNMR UIs are illustrated in FIGS. 3, 4, and 5. In particular, the PNMR UIs in FIGS. 3 and 4 are specific to a first user (for example, a CTO of the enterprise), and the PNMR UI in FIG. 5 is specific to a second user (for example, a temporary student intern of the enterprise). In one example, the presentation component 220 or the PNMR UI generator 292 of FIG. 2 automatically generates (block 650) the PNMR UI.

With reference to FIG. 7, aspects of example process flow 700 are illustratively provided for changing content on a player region (such as the player region 304 of FIGS. 3 and 4) based on a user selection (for example, in the section representation region 306). Example process flow 700 is performed to control playback of a meeting recording based on a section representation and corresponding user selection, as described in connection with FIG. 2. Control of the playback may be based on the meeting feature determiner 260, the meeting section determiner 270, the extracted feature data 280, and/or the meeting structure determiner 290, such as described in connection with FIG. 2.

At a block 710, method 700 includes receiving, from a computing device, a user request to access a meeting recording. In one example, the user request is received by the user activity monitor 250 or the meeting data-collection component of FIG. 2.

At block 720, the method 700 includes, subsequent to receiving the user request, presenting a PNMR UI comprising a player region (such as player region 304 of FIG. 3) and a section representation region (such as the section representation region 306 of FIG. 3) separate from the player region. In one embodiment, the section representation region includes a plurality of indications corresponding to a plurality of section representations of a plurality of sections of the meeting recording. Certain section representations are arranged based on a meeting structure determined based on a meeting feature. In one example, each indication of the plurality of indications includes at least one of: (1) an image or (2) a text summary. Example PNMR UIs are illustrated in FIGS. 3, 4, and 5. In particular, the PNMR UIs in FIGS. 3 and 4 are specific to a first user (for example, a CTO of the enterprise), and the PNMR UI in FIG. 5 is specific to a second user (for example, a temporary student intern of the enterprise). In one example, the presentation component 220 or the PNMR UI generator 292 of FIG. 2 automatically generates (block 650) the PNMR UI.

At block 730, the method 700 includes receiving, via the PNMR UI, a user input to a first indication corresponding to a first section representation of the plurality of section meeting section representations. For example, in FIG. 3, selection of the first section representation 310 may be realized via a click, tactile touch input, and so forth on the screen display 300.

At block 740, the method includes, based on the user input and the first indication, changing content on the player region to correspond to a first section of the meeting recording corresponding to the first section representation. In this manner, selection of the section representation causes playback of the meeting recording to change to the corresponding section of the meeting recording.

Turning to FIG. 8, aspects of example process flow 800 are illustratively provided for automatically generating a PNMR UI (for example, PNMR UI 302, 402, or 502) based on a meeting structure. Example process flow 800 is performed to playback a generate the PNMR UI to include a section representation, as described in connection with FIG. 2. In one embodiment, generation of the PNMR UI is based on the meeting feature determiner 260, the meeting section determiner 270, the extracted feature data 280, and/or the meeting structure determiner 290, such as described in connection with FIG. 2.

At a block 810, method 800 includes accessing meeting data associated with a meeting recording. Embodiments of block 810 perform operations including receiving meeting data, as discussed in FIG. 2, with respect to the meeting-data collection component 210 and the user activity monitor 250. In particular, meeting data may include any data associated with the user and a meeting attended by the user, an example of which includes meeting information, transcript information, contact information, and other user or meeting-related data discussed herein.

At block 820, method 800 includes determining a plurality of meeting features from the meeting data. Example meeting features include a topic of the meeting recording, a type of meeting recording, an identity of a speaker in the meeting recording, a relationship of the speaker to a viewer, a duration of the meeting recording, a duration of pauses in the meeting recording, a transition from a first speaker to a second speaker different from the first speaker, a meeting type, a media type, or contextual metadata expressed as data features indicative of meeting invitees, meeting attendees, or a type of meeting. In some embodiments, the meeting feature determiner 260 of FIG. 2 determines (block 620) the meeting features as discussed with respect to FIG. 2.

At block 830, method 800 includes determining (1) a first section of a plurality of sections of the meeting recording associated with a first meeting feature of the plurality of meeting features and (2) a second section the plurality of sections of the meeting recording associated to a second meeting feature of the plurality of meeting features. In one embodiment, the meeting section determiner 270 of FIG. 2 determines (block 620) the sections, as discussed herein.

At block 840, the method 800 includes, for each of the first and second sections of the meeting recording, (1) determining a section representation based on the first meeting feature and the second meeting feature, respectively, and (2) determining a meeting structure. In one example, each section representation includes at least one of: (i) an image generated based on visual content occurring during the corresponding section or (ii) a text summary corresponding to the corresponding section and generated based on the corresponding meeting feature.

At block 850, the method 800 automatically generating a personalized navigable meeting recording (PNMR) user interface (UI) based on the meeting structure. In one example, the PNMR UI includes an indication of each section based on the section representation. Example PNMR UIs are illustrated in FIGS. 3, 4, and 5. In particular, the PNMR UIs in FIGS. 3 and 4 are specific to a first user (for example, a CTO of the enterprise), and the PNMR UI in FIG. 5 is specific to a second user (for example, a temporary student intern of the enterprise). In one example, the presentation component 220 or the PNMR UI generator 292 of FIG. 2 automatically generates (block 650) the PNMR UI.

Accordingly, we have described various aspects of technology directed to systems and methods for intelligently processing and presenting, on a computing device, group data that is contextualized for a user. It is understood that various features, sub-combinations, and modifications of the embodiments described herein are of utility and may be employed in other embodiments without reference to other features or sub-combinations. Moreover, the order and sequences of steps shown in the example methods 600, 700, and 800 are not meant to limit the scope of the present disclosure in any way, and in fact, the steps may occur in a variety of different sequences within embodiments hereof. Such variations and combinations thereof are also contemplated to be within the scope of embodiments of this disclosure.

Other Embodiments

In some embodiments, a computer system is provided, such as the computerized (or computer or computing) system described in any of the embodiments above. The computer system comprises at least one processor, and computer memory having computer-readable instructions embodied thereon, that, when executed by the at least one processor, perform operations. The operations comprise accessing meeting data associated with a meeting recording; determining a meeting feature from the meeting data; and determining a plurality of sections of the meeting recording based on the meeting feature. Additionally, the operations include, for each section of the meeting recording determining a section representation based on at least the meeting feature and determining a meeting structure. Additionally, the operations include automatically generating a personalized navigable meeting recording (PNMR) user interface (UI) based on the meeting structure, the PNMR UI comprising an indication of each section based on the section representation In any combination of the above embodiments of the system, the section representation includes, for at least one section of the plurality of sections, at least one of: (1) an image or (2) a text summary, wherein the image is generated based on visual content occurring during the at least one section, and wherein the summary is generated based on at least one of the meeting feature, an audio transcript of the at least one section, and the visual content occurring during the at least one section.

In any combination of the above embodiments of the system, the operations further include, in response to receiving a user input to the image or the text summary for a respective indication, changing playback of the meeting recording on the PNMR UI to a section of the meeting recording corresponding to a respective section representation of the meeting recording associated with the respective indication.

In any combination of the above embodiments of the system, the text summary further includes a description of a speaker associated with the at least one section and that is relevant to a user, a topic associated with the at least one section and that is relevant to the user, a transcript of speech associated with the at least one section, and metadata about a format in which the at least one section is presented.

In any combination of the above embodiments of the system, determining the section representation includes (1) accessing user data; (2) based on the user data, determining a user feature; and (3) based on the meeting feature and the user feature, generating an image and a text summary that are both relevant to a particular user. The PNMR UI includes a first graphical user interface (GUI) element indicative of the image and a second GUI element indicative of the text summary.

In any combination of the above embodiments of the system, the meeting structure includes at least one of: a hierarchical logical organization, a chronological logical organization, a speaker-indexed logical organization, a topic-indexed logical organization, a relevance ranked logical organization.

In any combination of the above embodiments of the system, determining the meeting structure includes (1) determining, based on a first meeting feature and a first user feature associated with a first section of the meeting recording, a first relevance weight to a user profile; (2) determining, based on a second meeting feature and a second user feature associated with a second section of the meeting recording, a second relevance weight to the user profile; and (3) based on the first relevance weight being greater than the second relevance weight, generating the meeting structure with the first section ranked higher than the second section.

In any combination of the above embodiments of the system, based on the first section being ranked higher than the second section, the meeting structure for the first section and the second section comprises at least one of: the first section being listed above the second section, the first section being automatically played back before the second section, the first section being a grouping in a hierarchy and the second section being a subgroup of the grouping of the first section in the hierarchy, or the first section being displayed as more relevant than the second section.

In any combination of the above embodiments of the system, at least one section of the plurality of sections is determined by (1) determining a contiguous portion of the meeting recording having a common meeting feature comprising an indication of: a speaker, a topic, an audio content, a visual content, a relevance weight, a media type, or a meeting attendee; (2) determining a start time of the contiguous portion of the meeting recording that corresponds to a first change of the common meeting feature; (3) determining an end time of the contiguous portion of the meeting recording that corresponds to a second change of the common meeting feature; and (4) determining the at least one section of the meeting recording as the contiguous portion of the meeting recording from the start time to the end time.

In any combination of the above embodiments of the system, the operations further include accessing user data; and based on the user data, determining a user feature indicative of at least one of a role of a particular user, a level of user engagement of the particular user with a meeting corresponding to the meeting recording, or a relevance of a topic to the particular user. The meeting feature comprises a meeting feature specific to content of the meeting recording, and at least one of the section representation and the meeting structure is determined based on the user feature and the meeting feature.

In any combination of the above embodiments of the system, the meeting feature includes at least one of a topic of the meeting recording, a type of meeting recording, an identity of a speaker in the meeting recording, a relationship of the speaker to a viewer, a duration of the meeting recording, a duration of pauses in the meeting recording, a transition from a first speaker to a second speaker different from the first speaker, a meeting type, a media type, or contextual metadata expressed as data features indicative of meeting invitees, meeting attendees, or a type of meeting.

In some embodiments, a computerized method is provided. The method includes receiving, from a computing device, a user request to access a meeting recording and subsequent to receiving the user request, presenting a personalized navigable meeting recording (PNMR) user interface (UI) that includes a player region and a section representation region separate from the player region. The section representation region includes a plurality of indications corresponding to a plurality of section representations of a plurality of sections of the meeting recording and arranged based on a meeting structure determined based on a meeting feature. Each indication of the plurality of indications includes at least one of: (1) an image or (2) a text summary. The method also includes receiving, via the PNMR UI, a user input to a first indication corresponding to a first section representation of the plurality of section meeting section representations. The method also includes, based on the user input and the first indication, changing content on the player region to correspond to a first section of the meeting recording corresponding to the first section representation.

In any combination of the above embodiments of the method, receiving the user input includes: (1) receiving the user input selecting a portion of the text summary associated with the first section; (2) determining a topic of the selected portion of the text summary; (3) accessing the first section of the plurality of sections of the meeting recording; (4) determining a subsection of the first section associated with the topic; and (5) changing content on the player region to the subsection of the first section based on the selected portion of the text summary and the subsection being associated with the topic.

In any combination of the above embodiments of the method, the image is generated based on visual content occurring during the first section, and wherein the summary is generated based on the meeting feature.

In any combination of the above embodiments of the method, determining the section representation includes (1) accessing user data; (2) based on the user data, determining a user feature indicative of at least one of a role of a particular user, a level of user engagement of the particular user with a meeting corresponding to the meeting recording, or a relevance of a topic to the particular user; and (3) based on the meeting feature and the user feature, generating the image and the text summary. The PNMR UI includes a first graphical user interface (GUI) element indicative of the image and a second GUI element indicative of the text summary.

In any combination of the above embodiments of the method, the meeting structure includes at least one of: a hierarchical logical organization, a chronological logical organization, a speaker-indexed logical organization, a topic-indexed logical organization, a relevance ranked logical organization. Determining the meeting structure includes: (1) determining, based on a first meeting feature and a first user feature associated with the first section of the meeting recording, a first relevance weight to a user profile; (2) determining, based on a second meeting feature and a second user feature associated with a second section of the meeting recording, a second relevance weight to a user profile; and (3) based on the first relevance weight being greater than the second relevance weight, generating the meeting structure with the first section ranked higher than the second section.

In some embodiments, computer storage media is provided, such as any of the computer storage media described herein, that, when executed by at least one computer processor, causes computing operations to be performed. The operations include accessing meeting data associated with a meeting recording; determining a plurality of meeting features from the meeting data; and determining (1) a first section of a plurality of sections of the meeting recording associated with a first meeting feature of the plurality of meeting features and (2) a second section the plurality of sections of the meeting recording associated to a second meeting feature of the plurality of meeting features. The operations further include, for each of the first and second sections of the meeting recording, determining a meeting structure; and determining a section representation based on the first meeting feature and the second meeting feature, respectively. Each section representation comprises at least one of: (1) an image generated based on visual content occurring during the corresponding section or (2) a text summary corresponding to the corresponding section and generated based on the corresponding meeting feature. The operations further include automatically generating a personalized navigable meeting recording (PNMR) user interface (UI) based on the meeting structure.

In any combination of the above embodiments of the computer storage media, the meeting structure includes at least one of: a hierarchical logical organization, a chronological logical organization, a speaker-indexed logical organization, a topic-indexed logical organization, a relevance ranked logical organization. Determining the meeting structure comprises: (1) determining, based on the first meeting feature associated with the first section of the meeting recording, a first relevance weight and a first user feature associated with a user profile; (2) determining, based on the second meeting feature and a second user feature associated with the second section of the meeting recording, a second relevance weight to the user profile; and (3) based on the first relevance weight being greater than the second relevance weight, generating the meeting structure with the first section ranked higher than the second section.

In any combination of the above embodiments of the computer storage media, associating the first meeting feature to the first section includes (1) determining a start time and an end time associated with the first meeting feature; (2) determining whether the start time and the end time associated with the first meeting feature overlaps with a start time and an end time associated with the first section; and (3) based on a level of overlap between (1) the start time and the end time associated with the first meeting feature and (2) the start time and the end time associated with the first section, correlating the first meeting feature with the first section.

In any combination of the above embodiments of the computer storage media, the PNMR UI is personalized based on a type of device on which the PNMR UI is generated, wherein the quantity of section representations is proportional to a screen size of the device of the user.

Example Computing Environments

Figure 9:
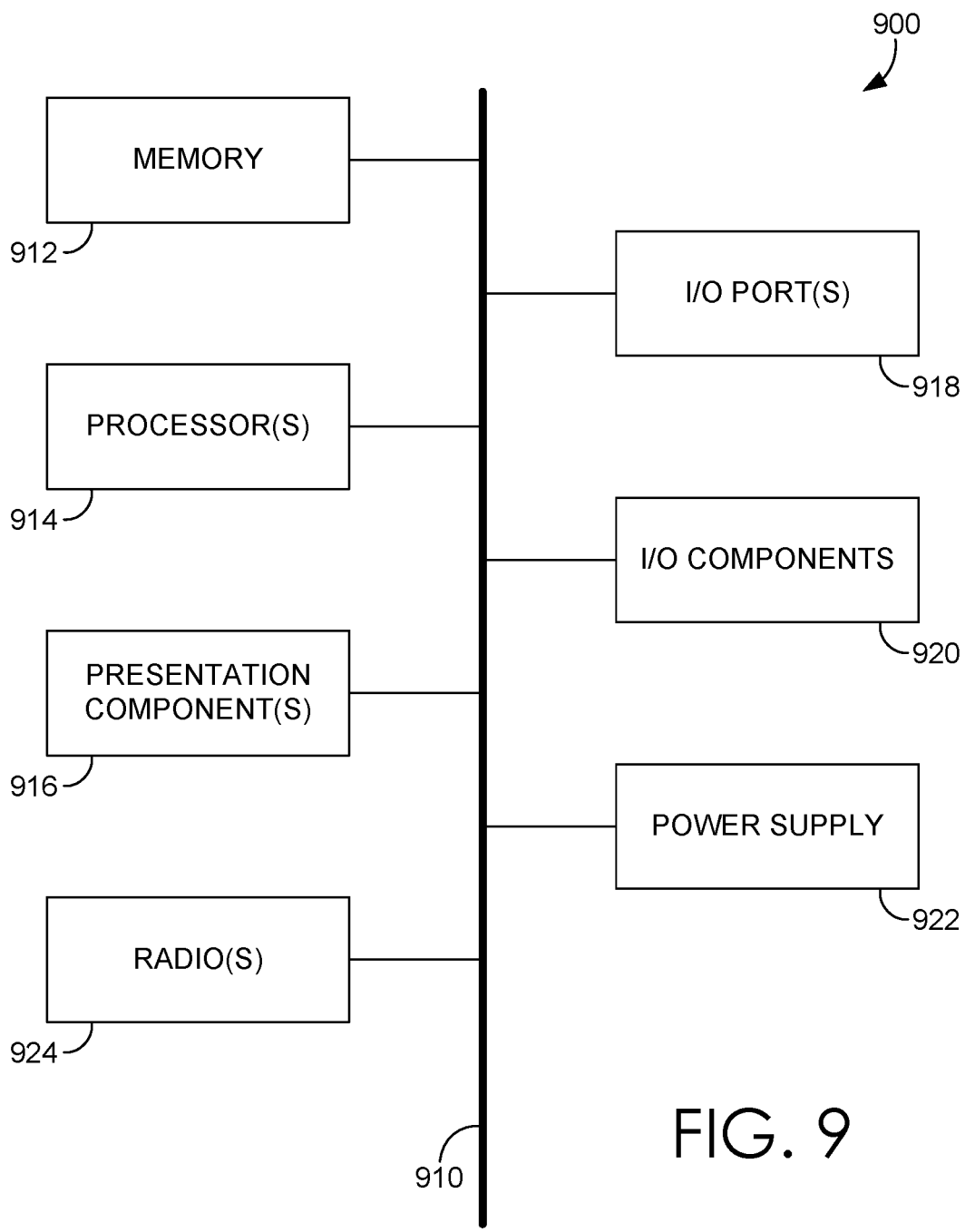
FIG. 9 is a block diagram of an example computing environment suitable for use in implementing an embodiment of the present disclosure.
Figure 10:
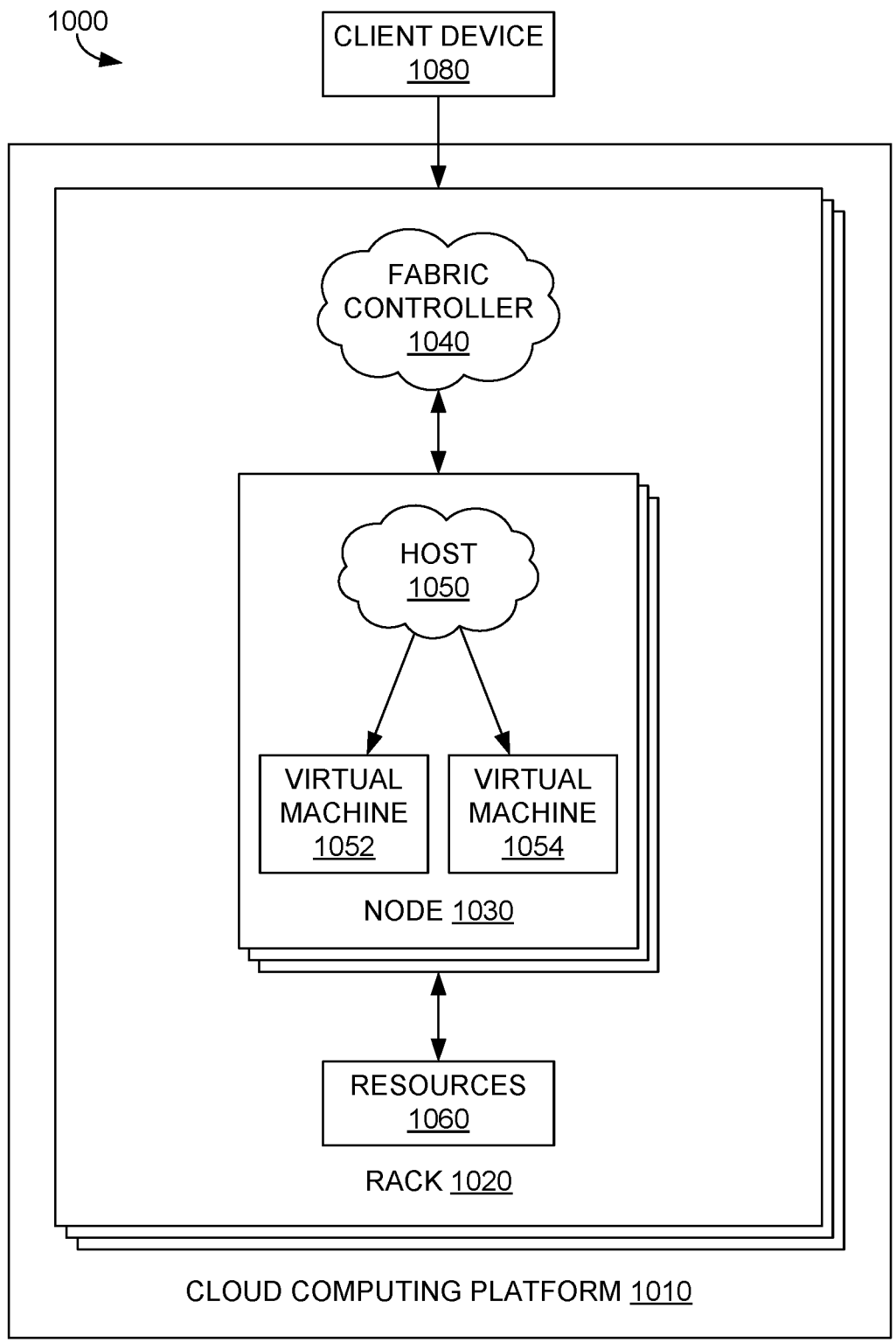
FIG. 10 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 9 and 10, respectively. With reference to FIG. 9, an example computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. In one example, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Certain embodiments of the disclosure are practiced in distributed computing environments where tasks are performed by remote-processing devices that are linked through a communications network. In a distributed computing environment, program modules may be located in both local and remote computer storage media including memory storage devices.

Some embodiments comprise an end-to-end software-based system operating within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher levels of software. Accordingly, in some embodiments, computer-executable instructions include any software, including low level software written in machine code, higher level software such as application software, and any combination thereof. In this regard, system components can manage resources and provide services for system functionality. Any other variations and combinations thereof are contemplated with the embodiments of the present disclosure.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more buses (such as an address bus, data bus, or combination thereof). Although the various blocks of FIG. 9 are shown with lines for the sake of clarity, in reality, these blocks represent logical, not necessarily actual, components. For example, a presentation component includes a display device, such as an I/O component. Also, certain processors have memory. The inventors hereof recognize that such is the nature of the art and reiterate that the diagram of FIG. 9 is merely illustrative of an example computing device that can be used in connection with one or more embodiments of the present disclosure. Distinction is not made between such categories as "workstation," "server," "laptop," or "handheld device," as all are contemplated within the scope of FIG. 9 and with reference to "computing device."

Certain embodiments of computing device 900 include a variety of computer-readable media. Computer-readable media can be any available media that can be accessed by computing device 900 and includes both volatile and non-volatile, removable and non-removable media. By way of example, and not limitation, computer-readable media comprises computer storage media and communication media. Computer storage media includes, but is not limited to, both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Certain communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

In one embodiment, memory 912 includes computer storage media in the form of volatile and/or nonvolatile memory. The memory can be removable, non-removable, or a combination thereof. Hardware devices include, for example, solid-state memory, hard drives, and optical-disc drives. Computing device 900 includes one or more processors 914 that read data from various entities such as memory 912 or I/O components 920. In one example, the term processor or "a processor" refers to more than one computer processor. For example, the term processor (or "a processor") may refer to at least one processor, which may be a physical or virtual processor, such as a computer processor on a virtual machine. In one example, the term processor (or "a processor") refers to a plurality of processors, each of which may be physical or virtual, such as a multiprocessor system, distributed processing or distributed computing architecture, cloud computing system, or parallel processing by more than a single processor. Further, various operations described herein as being executed or performed by processor may be performed by more than one processor.

Presentation component(s) 916 presents data indications to a user or other device. Presentation components include, for example, a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, or a wireless device. The I/O components 920 may provide a natural user interface (NUI) that processes air gestures, voice, or other physiological inputs generated by a user. In some embodiments, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. In one example, the computing device 900 is equipped with depth cameras, such as stereoscopic camera systems, infrared camera systems, RGB camera systems, and combinations of these, for gesture detection and recognition. Additionally or alternatively, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 include one or more radio(s) 924 (or similar wireless communication components). The radio transmits and receives radio or wireless communications. In one example, the computing device 900 is a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, such language generally refers to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection includes a connection using, by way of example and not limitation, one or more of CDMA, GPRS, GSM, TDMA, and 802.16 protocols.

Referring now to FIG. 10, an example distributed computing environment 1000 is illustratively provided, in which implementations of the present disclosure may be employed. In particular, FIG. 10 shows a high level architecture of an example cloud computing platform 1010 that can host a technical solution environment, or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1000 that includes cloud computing platform 1010, rack 1020, and node 1030 (for example, computing devices, processing units, or blades) in rack 1020. The technical solution environment can be implemented with cloud computing platform 1010, which runs cloud services across different data centers and geographic regions. In one embodiment, cloud computing platform 1010 implements fabric controller 1040 component for provisioning and managing resource allocation, deployment, upgrade, and management of cloud services. Typically, cloud computing platform 1010 acts to store data or run service applications in a distributed manner. Cloud computing platform 1010 in a data center is configurable to host and support operation of endpoints of a particular service application. Example cloud computing platforms 1010 include a public cloud, a private cloud, or a dedicated cloud.

Node 1030 can be provisioned with host 1050 (for example, operating system or runtime environment) running a defined software stack on node 1030. Node 1030 can also be configured to perform specialized functionality (for example, compute nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a multi-tenant infrastructure or tenancy. The terms "service application," "application," or "service" are used interchangeably with regards to FIG. 10, and broadly refer to any software, or portions of software, that run on top of, or access storage and computing device locations within, a datacenter.

When more than one separate service application is being supported by nodes 1030, nodes 1030 are partitioned into virtual machines (for example, virtual machine 1052 and virtual machine 1054), for example. Physical machines can also concurrently run separate service applications. In one embodiment, virtual machines or physical machines are configured as individualized computing environments that are supported by resources 1060 (for example, hardware resources and software resources) in cloud computing platform 1010. It is contemplated that resources can be configured for specific service applications. Further, each service application may be divided into functional portions such that each functional portion is able to run on a separate virtual machine. In cloud computing platform 1010, multiple servers may be used to run service applications and perform data storage operations in a cluster. In one embodiment, the servers perform data operations independently but exposed as a single device, referred to as a cluster. Each server in the cluster can be implemented as a node.

Client device 1080 may be linked to a service application in cloud computing platform 1010. Client device 1080 may be any type of computing device, such as user device 102*n* described with reference to FIG. 1, and the client device 1080 can be configured to issue commands to cloud computing platform 1010. In embodiments, client device 1080 communicates with service applications through a virtual Internet Protocol (IP) and load balancer or other means that direct communication requests to designated endpoints in cloud computing platform 1010. The components of cloud computing platform 1010 may communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers ℕ). The objects included in other sets may be continuous objects (for example, the set of real numbers ℝ). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the not null space or empty set of objects. A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjoint sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provides an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment; however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer system comprising:
   at least one processor; and
   computer memory having computer-readable instructions embodied thereon, that, when executed by the at least one processor, perform operations comprising:
      accessing meeting data associated with a meeting recording;
      determining a meeting feature from the meeting data, where the meeting feature is generated without user interaction;
      determining a plurality of sections of the meeting recording based on the meeting feature;
      for a first section of the plurality of sections of the meeting recording:
         determining a section representation based on at least the meeting feature, where the section representation includes at least:
            a summary of the first section generated based on transcript associated with the first section and at least one video frame of the first section;
            a graphical user interface element that includes the summary where at least a portion of the summary is selectable to cause playback of the meeting recording corresponding to the first section; and
      determining a meeting structure; and
      automatically generating a personalized navigable meeting recording (PNMR) user interface (UI) including the section representation based on the meeting structure, the PNMR UI comprising an indication of each section based on the section representation.

2. The system of claim 1, wherein the section representation further comprises an image, wherein the image is further generated based on visual content occurring during the at least one section.

3. The system of claim 2, wherein the operations comprise, in response to receiving a user input to the image or the text summary for a respective indication, changing playback of the meeting recording on the PNMR UI to a section of the meeting recording corresponding to a respective section representation of the meeting recording associated with the respective indication.

4. The system of claim 2, wherein the summary comprises a description of a speaker associated with the first section and that is relevant to a user, a topic associated with the first section and that is relevant to the user, and metadata about a format in which the first section is presented.

5. The system of claim 1, wherein determining the section representation comprises:
   accessing user data;
   based on the user data, determining a user feature; and
   based on the meeting feature and the user feature, generating the image and the summary that are each relevant to a particular user associated with the user data, wherein the section representation futher comprises a first graphical user interface (GUI) element indicative of the image and a second GUI element indicative of the summary.

6. The system of claim 1, wherein the meeting structure comprises at least one of: a hierarchical logical organization, a chronological logical organization, a speaker-indexed logical organization, a topic-indexed logical organization, a relevance ranked logical organization.

7. The system of claim 1, wherein determining the meeting structure comprises:
   determining, based on a first meeting feature and a first user feature associated with a first section of the meeting recording, a first relevance weight to a user profile;
   determining, based on a second meeting feature and a second user feature associated with a second section of the meeting recording, a second relevance weight to the user profile; and
   based on the first relevance weight being greater than the second relevance weight, generating the meeting structure with the first section ranked higher than the second section.

8. The system of claim 7, wherein based on the first section being ranked higher than the second section, the meeting structure for the first section and the second section comprises at least one of: the first section being listed above the second section, the first section being automatically played back before the second section, the first section being a grouping in a hierarchy and the second section being a subgroup of the grouping of the first section in the hierarchy, or the first section being displayed as more relevant than the second section.

9. The system of claim 1, wherein at least one section of the plurality of sections is determined by:
   determining a contiguous portion of the meeting recording having a common meeting feature comprising an indication of: a speaker, a topic, an audio content, a visual content, a relevance weight, a media type, or a meeting attendee;
   determining a start time of the contiguous portion of the meeting recording that corresponds to a first change of the common meeting feature;
   determining an end time of the contiguous portion of the meeting recording that corresponds to a second change of the common meeting feature; and
   determining the at least one section of the meeting recording as the contiguous portion of the meeting recording from the start time to the end time.

10. The system of claim 1, wherein the operations comprise:
    accessing user data; and
    based on the user data, determining a user feature indicative of at least one of a role of a particular user, a level of user engagement of the particular user with a meeting corresponding to the meeting recording, or a relevance of a topic to the particular user, wherein the meeting feature comprises a meeting feature specific to content of the meeting recording, and wherein the section representation and the meeting structure is determined based on the user feature and the meeting feature.

11. The system of claim 1, wherein the meeting feature comprises at least one of a topic of the meeting recording, a type of meeting recording, an identity of a speaker in the meeting recording, a relationship of the speaker to a viewer, a duration of the meeting recording, a duration of pauses in the meeting recording, a transition from a first speaker to a second speaker different from the first speaker, a meeting type, a media type, or contextual metadata expressed as data features indicative of meeting invitees, meeting attendees, or a type of meeting.

12. A computerized method, comprising:
    receiving, from a computing device, a user request to access a meeting recording;
    subsequent to receiving the user request, presenting a personalized navigable meeting recording (PNMR) user interface (UI) comprising a player region and a section representation region separate from the player region, the section representation region comprising a plurality of indications corresponding to a plurality of section representations of a plurality of sections of the meeting recording and arranged based on a meeting structure determined based on a meeting feature, each indication of the plurality of indications comprising:
    (1) an image extracted from a video frame corresponding to a section of the plurality of sections of the meeting recording;
    (2) a text summary generated based at least in part on a transcript of the audio corresponding to the section of the plurality of sections of the meeting recording, wherein the text summary includes text relevant to a user determined based on a user feature associated with the user extracted from user data associated with the user; and
    (3) a selectable user interface element included in the summary that causes playback of the section of the plurality of sections of the meeting recording;
    receiving, via the PNMR UI, a user input to a first indication corresponding to a first section representation of the plurality of section meeting section representations; and
    based on the user input and the first indication, changing content on the player region to correspond to a first section of the meeting recording corresponding to the first section representation.

13. The computerized method of claim 12, wherein receiving the user input comprises:
    receiving the user input selecting a portion of the selectable user interface element of the text summary associated with the first section;
    determining a topic of the selected portion of the text summary;
    accessing the first section of the plurality of sections of the meeting recording;
    determining a subsection of the first section associated with the topic; and
    changing content on the player region to the subsection of the first section based on the selected portion of the text summary and the subsection being associated with the topic.

14. The computerized method of claim 12, wherein the image is generated based on visual content occurring during the first section, and wherein the summary is generated based on the meeting feature.

15. The computerized method of claim 12, wherein determining the section representation comprises:
    accessing the user data;
    based on the user data, determining a role of the user; and
    based on the meeting feature and the role of the user, generating the image and the text summary corresponding to the role of the particular user.

16. The computerized method of claim 12, wherein the meeting structure comprises at least one of: a hierarchical logical organization, a chronological logical organization, a speaker-indexed logical organization, a topic-indexed logical organization, a relevance ranked logical organization, and wherein determining the meeting structure comprises:
    determining, based on a first meeting feature and a first user feature associated with the first section of the meeting recording, a first relevance weight to a user profile;
    determining, based on a second meeting feature and a second user feature associated with a second section of the meeting recording, a second relevance weight to a user profile; and
    based on the first relevance weight being greater than the second relevance weight, generating the meeting structure with the first section ranked higher than the second section.

17. Computer storage device having computer-executable instructions embodied thereon, that, when executed by at least one computer processor, cause computing operations to be performed, comprising:
    accessing meeting data associated with a meeting recording;
    determining a plurality of meeting features from the meeting data, wherein the plurality of meeting features are determined without an input from a user;
    determining (1) a first section of a plurality of sections of the meeting recording associated with a first meeting feature of the plurality of meeting features and (2) a second section the plurality of sections of the meeting recording associated to a second meeting feature of the plurality of meeting features;

for each of the first and second sections of the meeting recording: determining a first section representation and a second section representation based on the first meeting feature and the second meeting feature, respectively, wherein each section representation comprises: (1) an image generated based on visual content occurring during the corresponding section or (2) a text summary corresponding to the corresponding section and generated based on the corresponding meeting feature and a transcript of the corresponding section of the meeting recording, wherein a portion of the text summary is a selectable user interface elements that causes playback of the meeting recording corresponding to the meeting feature;

determining a meeting structure; and automatically generating, for the user, a personalized navigable meeting recording (PNMR) user interface (UI) based on the meeting structure, where the PNMRUI includes the first section representation and the second section representation.

18. The computer storage device of claim 17, wherein associating the first meeting feature to the first section comprises:

determining a start time and an end time of the meeting recording associated with the first meeting feature;

determining whether the start time and the end time associated with the first meeting feature overlaps with a start time and an end time associated with the first section; and based on a level of overlap between (1) the start time and the end time associated with the first meeting feature and (2) the start time and the end time associated with the first section, correlating the first meeting feature with the first section.

19. The computer storage device of claim 18, wherein the meeting structure comprises at least one of: a hierarchical logical organization, a chronological logical organization, a speaker-indexed logical organization, a topic-indexed logical organization, a relevance ranked logical organization, and wherein determining the meeting structure comprises:

determining, based on the first meeting feature associated with the first section of the meeting recording, a first relevance weight and a first user feature associated with a user profile;

determining, based on the second meeting feature and a second user feature associated with the second section of the meeting recording, a second relevance weight to the user profile; and based on the first relevance weight being greater than the second relevance weight, generating the meeting structure with the first section ranked higher than the second section.

20. The system of claim 1, wherein the operations comprise:

determining plurality of meeting features from the meeting data;

determining a first user feature and a second user feature based on user data, where the first user feature is associated with a first user profile and the second user feature is associated with a second user profile;

determine a first weight and a second weight associated with a section of the plurality of sections based on a classification or the plurality of meeting features and the first user feature and the second user features; and generating a first PNMR UI and a second PNMR UI, where the first PNMR UI includes the section based on the first weight and the second PNMR UI does not include the second based on the second weight.

* * * * *